(12) United States Patent
Akl et al.

(10) Patent No.: US 11,979,785 B2
(45) Date of Patent: May 7, 2024

(54) CONDITIONAL HANDOVER USING CELL GLOBAL IDENTIFIERS

(71) Applicant: QUALCOMM Incorporated, San Diego, CA (US)

(72) Inventors: Naeem Akl, Somerville, NJ (US); Karl Georg Hampel, Hoboken, NJ (US); Ozcan Ozturk, San Diego, CA (US); Navid Abedini, Basking Ridge, NJ (US); Jianghong Luo, Skillman, NJ (US); Luca Blessent, Whitehouse Station, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 334 days.

(21) Appl. No.: 17/304,814

(22) Filed: Jun. 25, 2021

(65) Prior Publication Data

US 2022/0014990 A1    Jan. 13, 2022

Related U.S. Application Data

(60) Provisional application No. 62/705,721, filed on Jul. 13, 2020.

(51) Int. Cl.
*H04W 36/08* (2009.01)
*H04W 36/00* (2009.01)

(52) U.S. Cl.
CPC ....... *H04W 36/08* (2013.01); *H04W 36/0061* (2013.01)

(58) Field of Classification Search
CPC . H04W 36/08; H04W 36/0061; H04W 36/36; H04W 48/12; H04W 48/16
See application file for complete search history.

(56) References Cited

U.S. PATENT DOCUMENTS

| | | | |
|---|---|---|---|
| 2016/0381608 A1* | 12/2016 | Marinier | H04W 36/0061 455/73 |
| 2020/0163048 A1* | 5/2020 | Kim | H04W 72/12 |
| 2020/0275340 A1* | 8/2020 | Kim | H04W 36/36 |
| 2021/0083763 A1* | 3/2021 | Ananth | H04B 7/18532 |

(Continued)

OTHER PUBLICATIONS

U.S. Appl. No. 63/028,294,Specification, filed May 21, 2020 (Year: 2020).*

(Continued)

*Primary Examiner* — Chi H Pham
*Assistant Examiner* — Ji-Hae Yea
(74) *Attorney, Agent, or Firm* — Harrity & Harrity, LLP

(57) ABSTRACT

Various aspects of the present disclosure generally relate to wireless communication. In some aspects, a wireless node may receive, while connected to a first cell associated with a physical cell identifier (PCI) and a first cell global identifier (CGI), a message that includes an indication to connect to a second cell, associated with the PCI and a second CGI, responsive to detecting the second CGI in a system information message associated with the PCI. The wireless node may connect to the second cell based at least in part on detecting the second CGI in the system information message associated with the PCI. Numerous other aspects are provided.

30 Claims, 13 Drawing Sheets

(56) References Cited

U.S. PATENT DOCUMENTS

2021/0321312 A1* 10/2021 Yan .................... H04W 36/30
2023/0164650 A1*  5/2023 Wu .................. H04W 36/0069
                                                     370/331

OTHER PUBLICATIONS

U.S. Appl. No. 63/028,294,Drawings—only_black_and_white_line_drawings, filed May 21, 2020 (Year: 2020).*
62/979,544,Specification, filed Feb. 21, 2020 (Year: 2020).*

* cited by examiner

CONDITIONAL HANDOVER USING CELL GLOBAL IDENTIFIERS

CROSS-REFERENCE TO RELATED APPLICATION

This Patent Application claims priority to U.S. Provisional Patent Application No. 62/705,721, filed on Jul. 13, 2020, entitled "CONDITIONAL HANDOVER USING CELL GLOBAL IDENTIFIERS," and assigned to the assignee hereof. The disclosure of the prior Application is considered part of and is incorporated by reference into this Patent Application.

FIELD OF THE DISCLOSURE

Aspects of the present disclosure generally relate to wireless communication and specifically, to techniques and apparatuses for conditional handover using cell global identifiers (CGIs).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

In some wireless systems (for example, a 5G/NR wireless system), a physical cell identifier (PCI) may be used to identify a cell. In contrast to a cell global identifier (CGI), which is unique to a cell, a single PCI may be associated with multiple cells in a network. Accordingly, a UE may not be able to differentiate the reference signals transmitted on multiple neighboring cells associated with the same PCI because the reference signals may be scrambled based on the same PCI. Moreover, in some wireless systems, conditional handover from a first cell to a second cell may be based on PCIs associated with the cells. For example, a UE may determine to execute the conditional handover based on detecting a PCI associated with the second cell in system information. Accordingly, a UE may not be enabled to execute a conditional handover from a first cell to a second cell when the cells are associated with the same PCI.

SUMMARY

In some aspects, a method of wireless communication performed by a wireless node includes receiving, while connected to a first cell associated with a physical cell identifier (PCI) and a first cell global identifier (CGI), a message that includes an indication to connect to a second cell, associated with the PCI and a second CGI, responsive to detecting the second CGI in a system information message associated with the PCI. In some aspects, the method may include connecting to the second cell based at least in part on detecting the second CGI in the system information message associated with the PCI.

In some aspects, a method of wireless communication performed by a network node includes transmitting, to a wireless node connected to a first cell associated with a PCI and a first CGI, a message that includes an indication that the wireless node is to connect to a second cell, associated with the PCI and a second CGI, responsive to detecting the second CGI in a system information message associated with the PCI. In some aspects, the method may include receiving, from the wireless node, another message indicating that the wireless node has applied the indication to connect to the second cell.

In some aspects, a wireless node for wireless communication includes a memory and one or more processors coupled to the memory. In some aspects, the one or more processors may be configured to receive, while connected to a first cell associated with a PCI and a first CGI, a message that includes an indication to connect to a second cell, associated with the PCI and a second CGI, responsive to detecting the second CGI in a system information message associated with the PCI. In some aspects, the one or more processors may be configured to connect to the second cell based at least in part on detecting the second CGI in the system information message associated with the PCI.

In some aspects, a network node for wireless communication includes a memory and one or more processors coupled to the memory. In some aspects, the one or more processors may be configured to transmit, to a wireless node connected to a first cell associated with a PCI and a first CGI, a message that includes an indication that the wireless node is to connect to a second cell, associated with the PCI and a second CGI, responsive to detecting the second CGI in a system information message associated with the PCI. In some aspects, the one or more processors may be configured to receive, from the wireless node, another message indicating that the wireless node has applied the indication to connect to the second cell.

In some aspects, a non-transitory computer-readable medium storing a set of instructions for wireless communication includes one or more instructions that, when executed by one or more processors of a wireless node, cause the wireless node to receive, while connected to a first cell associated with a PCI and a first CGI, a message that includes an indication to connect to a second cell, associated with the PCI and a second CGI, responsive to detecting the second CGI in a system information message associated with the PCI. In some aspects, the one or more instructions, when executed by the one or more processors of the wireless node, cause the wireless node to connect to the second cell based at least in part on detecting the second CGI in the system information message associated with the PCI.

In some aspects, a non-transitory computer-readable medium storing a set of instructions for wireless communication includes one or more instructions that, when executed by one or more processors of a network node, cause the network node to transmit, to a wireless node connected to a first cell associated with a PCI and a first CGI, a message that includes an indication that the wireless node is to connect to a second cell, associated with the PCI and a second CGI, responsive to detecting the second CGI in a system information message associated with the PCI. In some aspects, the one or more instructions, when executed by the one or more processors of the network node, cause the network node to receive, from the wireless node, another message indicating that the wireless node has applied the indication to connect to the second cell.

In some aspects, an apparatus for wireless communication includes means for receiving, while connected to a first cell associated with a PCI and a first CGI, a message that includes an indication to connect to a second cell, associated with the PCI and a second CGI, responsive to detecting the second CGI in a system information message associated with the PCI. In some aspects, the apparatus includes means for connecting to the second cell based at least in part on detecting the second CGI in the system information message associated with the PCI.

In some aspects, an apparatus for wireless communication includes means for transmitting, to a wireless node connected to a first cell associated with a PCI and a first CGI, a message that includes an indication that the wireless node is to connect to a second cell, associated with the PCI and a second CGI, responsive to detecting the second CGI in a system information message associated with the PCI. In some aspects, the apparatus includes means for receiving, from the wireless node, another message indicating that the wireless node has applied the indication to connect to the second cell.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
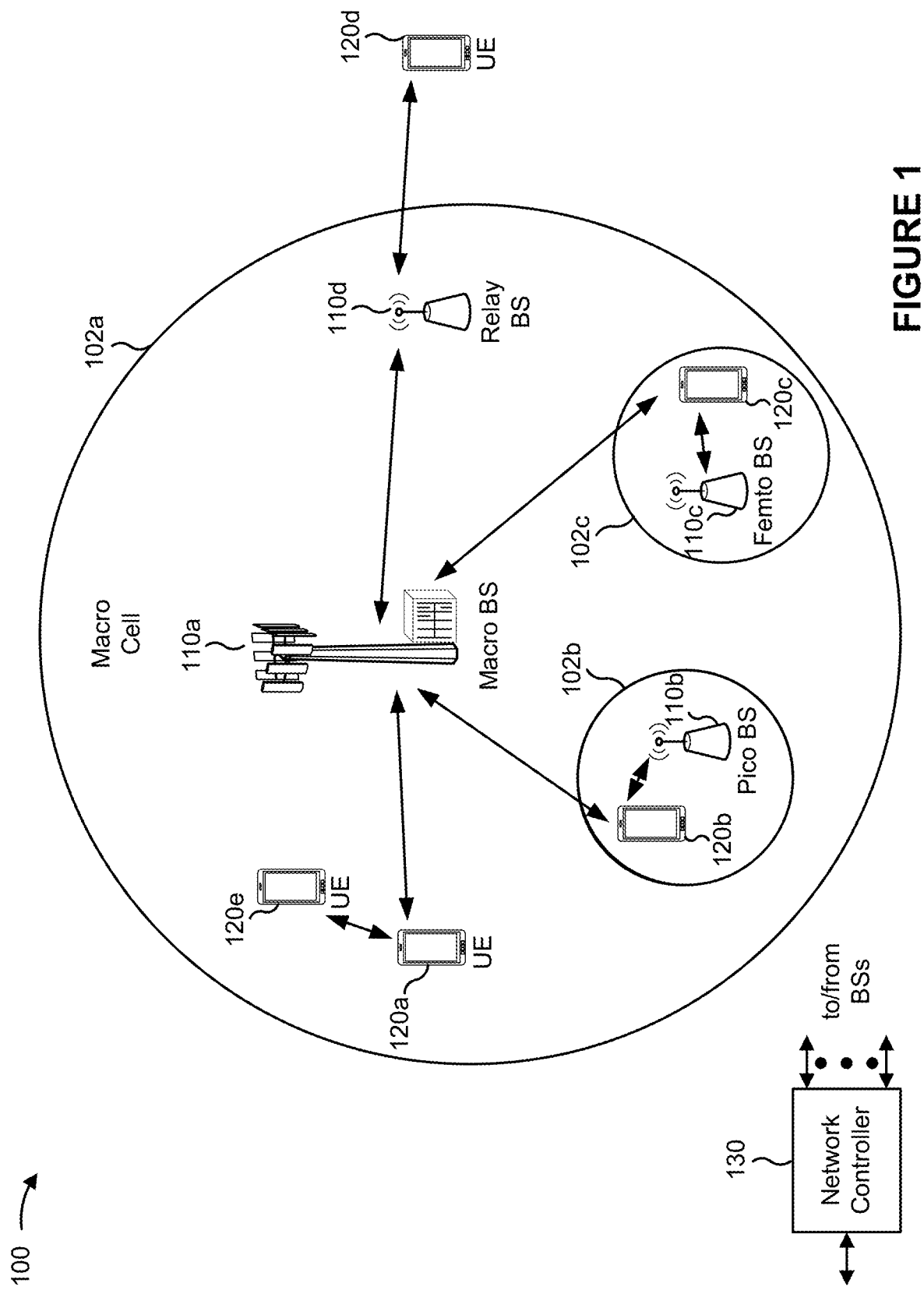
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to conditional handover of a wireless node based at least in part on a cell global identifier (CGI). Some aspects more specifically relate to conditional handover of a wireless node based at least in part on a change of a CGI without a change in a physical cell identifier (PCI). In some aspects, a wireless node, connected to a first cell associated with a PCI and a first CGI, may receive an indication to connect to a second cell, associated with the same PCI and a second CGI, responsive to detecting the second CGI in a system information message associated with the PCI. In some aspects, the wireless node may connect to the second cell based at least in part on detecting the second CGI in the system information message associated with the PCI.

Particular aspects of the subject matter described in this disclosure can be implemented to realize one or more of the following potential advantages. In some examples, the described techniques can be used to support conditional handover for a wireless node based at least in part on a change of a CGI rather than a change of a PCI. In this way, the wireless node may be configured with a handover command prior to loss of a source path. Moreover, reconfiguration messages during the handover may be eliminated, thereby reducing handover latency.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), or other network entities. A base station 110 is an entity that communicates with UEs 120. A base station 110 (sometimes referred to as a BS) may include, for example, an NR base station, an LTE base station, a Node B, an eNB (for example, in 4G), a gNB (for example, in 5G), an access point, or a transmission reception point (TRP). Each base station 110 may provide communication coverage for a particular geographic area. In the Third Generation Partnership Project (3GPP), the term "cell" can refer to a coverage area of a base station 110 or a base station subsystem serving this coverage area, depending on the context in which the term is used.

A base station 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station.

The wireless network 100 may be a heterogeneous network that includes base stations 110 of different types, such as macro base stations, pico base stations, femto base stations, or relay base stations. These different types of base stations 110 may have different transmit power levels, different coverage areas, or different impacts on interference in the wireless network 100. For example, macro base stations may have a high transmit power level (for example, 5 to 40 watts) whereas pico base stations, femto base stations, and relay base stations may have lower transmit power levels (for example, 0.1 to 2 watts). In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (for example, three) cells. A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

In some examples, a cell may not necessarily be stationary, and the geographic area of the cell may move in accordance with the location of a base station 110 that is mobile (for example, a mobile base station). In some examples, the base stations 110 may be interconnected to one another or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a base station 110 or a UE 120) and send a transmission of the data to a downstream station (for example, a UE 120 or a base station 110). A relay station may be a UE 120 that can relay transmissions for other UEs 120. In the example shown in FIG. 1, the BS 110d (for example, a relay base station) may communicate with the BS 110a (for example, a macro base station) and the UE 120d in order to facilitate communication between the BS 110a and the UE 120d. A base station 110 that relays communications may be referred to as a relay station, a relay base station, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a base station, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular radio access technology (RAT) and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the base station 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz," if used herein, may broadly represent frequencies that may be less than 6 GHz, may be within FR1, or may include mid-band frequencies. Further, unless specifically stated otherwise, it should be understood that the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

Figure 2:
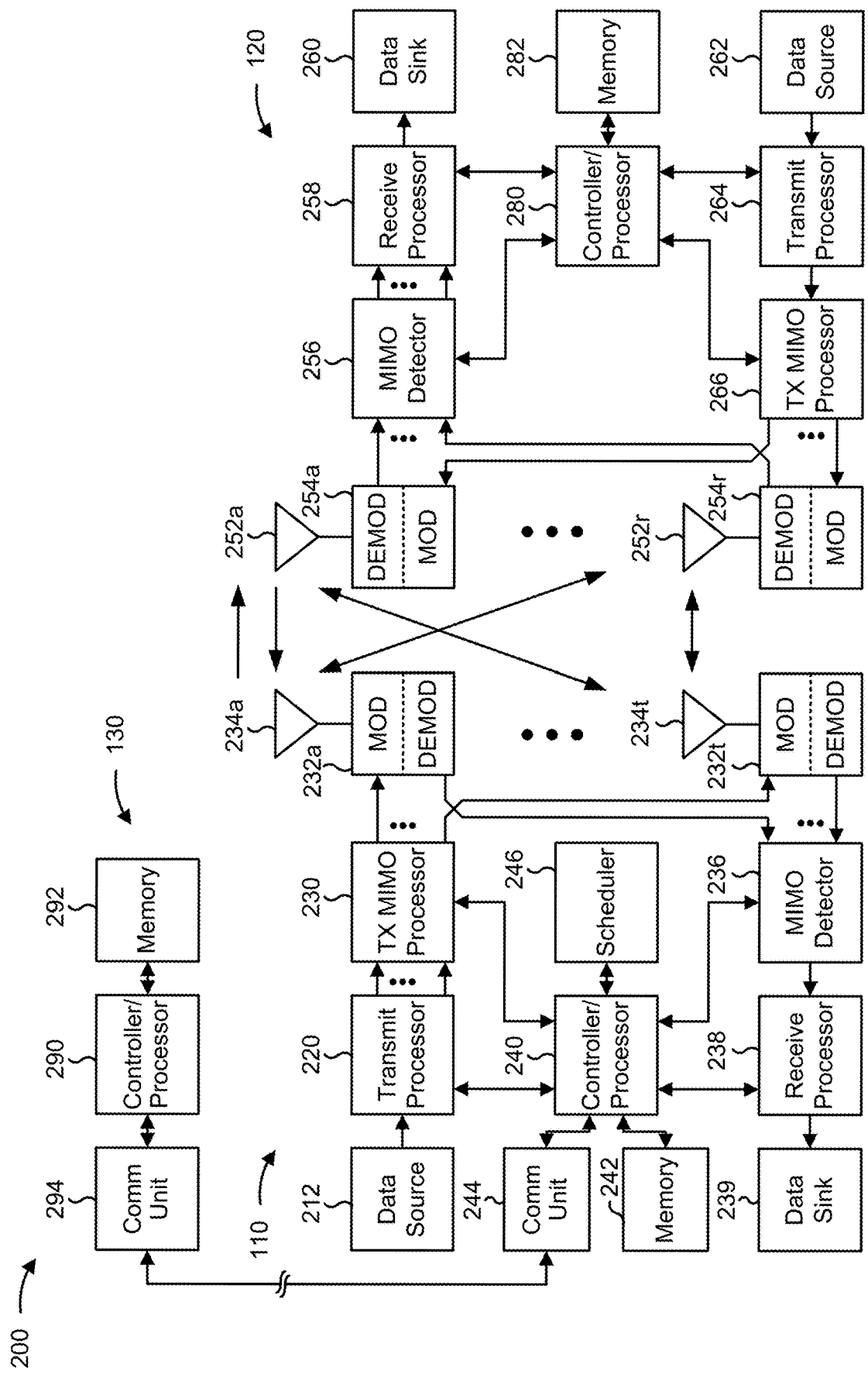
FIG. 2 is a diagram illustrating an example base station in communication with a user equipment (UE) in a wireless network in accordance with the present disclosure.

FIG. 2 is a diagram illustrating an example base station in communication with a UE in a wireless network in accordance with the present disclosure. The base station may correspond to the base station 110 of FIG. 1. Similarly, the UE may correspond to the UE 120 of FIG. 1. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to T modulators (MODs) 232a through 232t. Each MOD 232 may process a respective output symbol stream (for example, for OFDM) to obtain an output sample stream. Each MOD 232 may further process (for example, convert to analog, amplify, filter, or upconvert) the output sample stream to obtain a downlink signal. T downlink signals from MODs 232a through 232t may be transmitted via T antennas 234a through 234t, respectively.

At the UE 120, a set of antennas 252 (shown as antennas 252*a* through 252*r*) may receive the downlink signals from the base station 110 or other base stations 110 and may provide a set of received signals to R demodulators (DEMODs) 254*a* through 254*r*, respectively. Each DEMOD 254 may condition (for example, filter, amplify, downconvert, and digitize) a received signal to obtain input samples. Each DEMOD 254 may further process the input samples (for example, for OFDM) to obtain received symbols. A MIMO detector 256 may obtain received symbols from all R DEMODs 254*a* through 254*r*, perform MIMO detection on the received symbols if applicable, and provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (for example, antennas 234*a* through 234*t* or antennas 252*a* through 252*r*) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by MODs 254*a* through 254*r* (for example, for DFT-s-OFDM or CP-OFDM), and transmitted to the base station 110. In some examples, the UE 120 includes a transceiver. The transceiver may include any combination of the antenna(s) 252, the modulators 254, the demodulators 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the base station 110, the uplink signals from UE 120 or other UEs may be received by the antennas 234, processed by DEMODs 232, detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink or uplink communications. In some examples, the base station 110 includes a transceiver. The transceiver may include any combination of the antenna(s) 234, the modulators 232, the demodulators 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the base station 110, the controller/processor 280 of the UE 120, or any other component(s) of FIG. 2 may perform one or more techniques associated with conditional handover using CGIs, as described in more detail elsewhere herein. For example, the controller/processor 240 of the base station 110, the controller/processor 280 of the UE 120, or any other component(s) of FIG. 2 may perform or direct operations of, for example, process 1000 of FIG. 10, process 1100 of FIG. 11, or other processes as described herein. The memory 242 and the memory 282 may store data and program codes for the base station 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 1000 of FIG. 10, process 1100 of FIG. 11, or other processes as described herein. In some examples, executing instructions may include running the instructions, converting the instructions, compiling the instructions, or interpreting the instructions, among other examples.

In some aspects, a wireless node (for example, a UE 120, an integrated access and backhaul (IAB) node, among other examples) may include means for receiving, while connected to a first cell associated with a PCI and a first CGI, a message that includes an indication to connect to a second cell, associated with the PCI and a second CGI, responsive to detecting the second CGI in a system information message associated with the PCI, means for connecting to the second cell based at least in part on detecting the second CGI in the system information message associated with the PCI, among other examples, or combinations thereof. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, or receive processor 258.

In some aspects, a network node (for example, a base station 110, an IAB node, an IAB donor, among other examples) may include means for determining that a wireless node, connected to a first cell associated with a PCI and a first CGI, is to connect to a second cell, associated with the PCI and a second CGI, responsive to detecting the second CGI in a system information message associated with the PCI, means for transmitting a message that includes an indication that the wireless node is to connect to the second cell responsive to detecting the second CGI in the system information message associated with the PCI, means for receiving another message indicating that the wireless node has applied the indication to connect to the second cell, among other examples, or combinations thereof. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, or antenna 234, among other examples.

Figure 3:
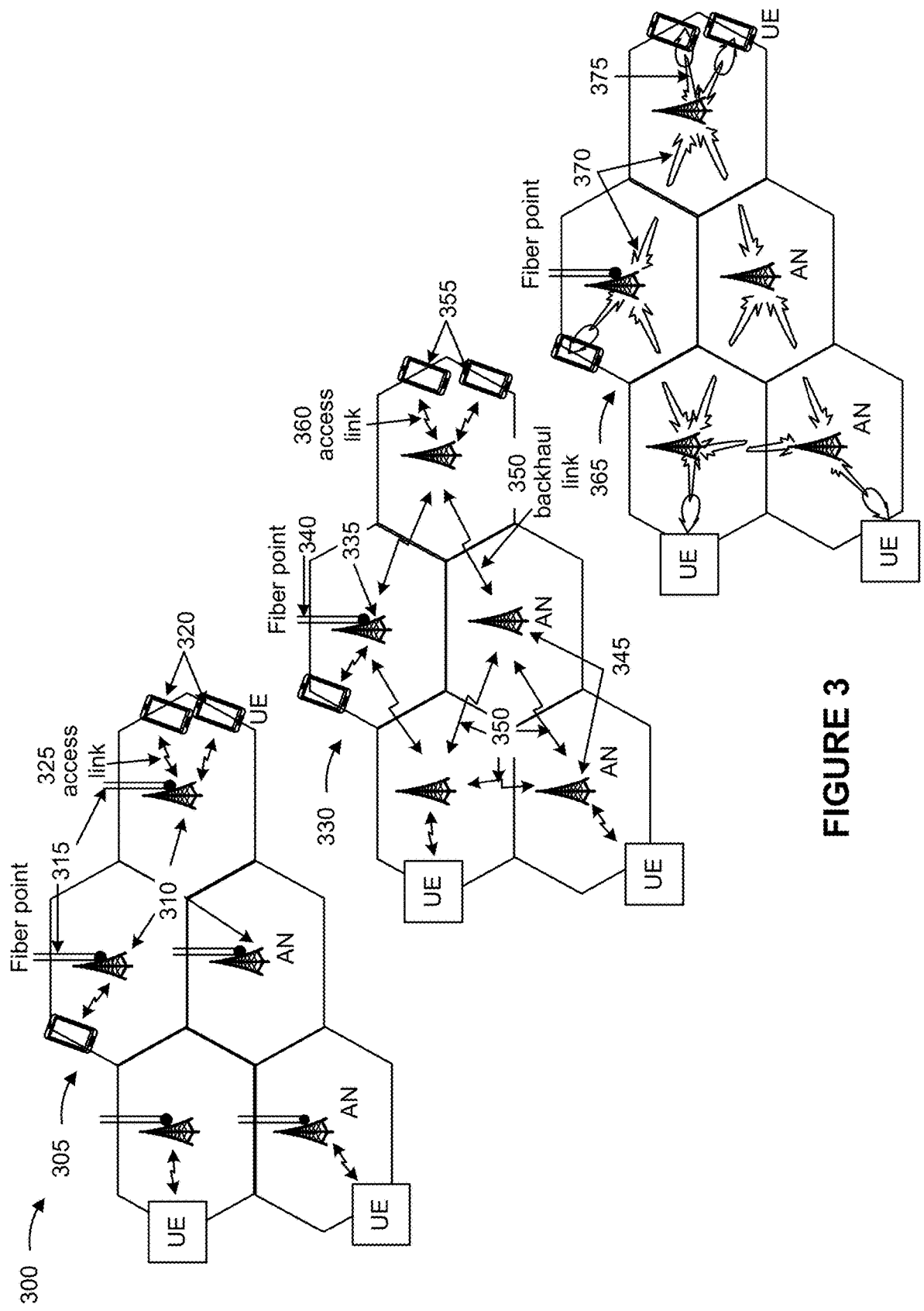
FIG. 3 is a diagram illustrating examples of radio access networks, in accordance with the present disclosure.

FIG. 3 is a diagram illustrating examples 300 of radio access networks, in accordance with the present disclosure. As indicated by reference number 305, a traditional (for example, 3G, 4G, LTE, among other examples) radio access network may include multiple base stations 310 (for example, access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As indicated by reference number 330, a radio access network may include a wireless backhaul network, sometimes referred to as an IAB network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (for example, via one or more non-anchor base stations 345) to form a backhaul path to the core network for carrying backhaul traffic. Backhaul link 350 may be a wireless link. Anchor base station(s) 335 or non anchor base station(s) 345 may communicate with one or more UEs 355 via access links 360, which may be wireless links for carrying access traffic. In some aspects, an anchor base station 335 or a non-anchor base station 345 shown in FIG. 3 may be a base station 110 shown in FIG. 1. In some aspects, a UE 355 shown in FIG. 3 may be a UE 120 shown in FIG. 1.

As indicated by reference number 365, in some aspects, a radio access network that includes an IAB network may utilize millimeter wave technology or directional communications (for example, beamforming, among other examples) for communications between base stations or UEs (for example, between two base stations, between two UEs, or between a base station and a UE). For example, wireless backhaul links 370 between base stations may use millimeter wave signals to carry information or may be directed toward a target base station using beamforming, among other examples. Similarly, the wireless access links 375 between a UE and a base station may use millimeter wave signals or may be directed toward a target wireless node (for example, a UE or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (for example, a peer-to-peer network, a device-to-device network, among other examples). In such examples, "anchor node" may refer to a UE that is directly in communication with a base station (for example, an anchor base station or a non-anchor base station).

Figure 4:
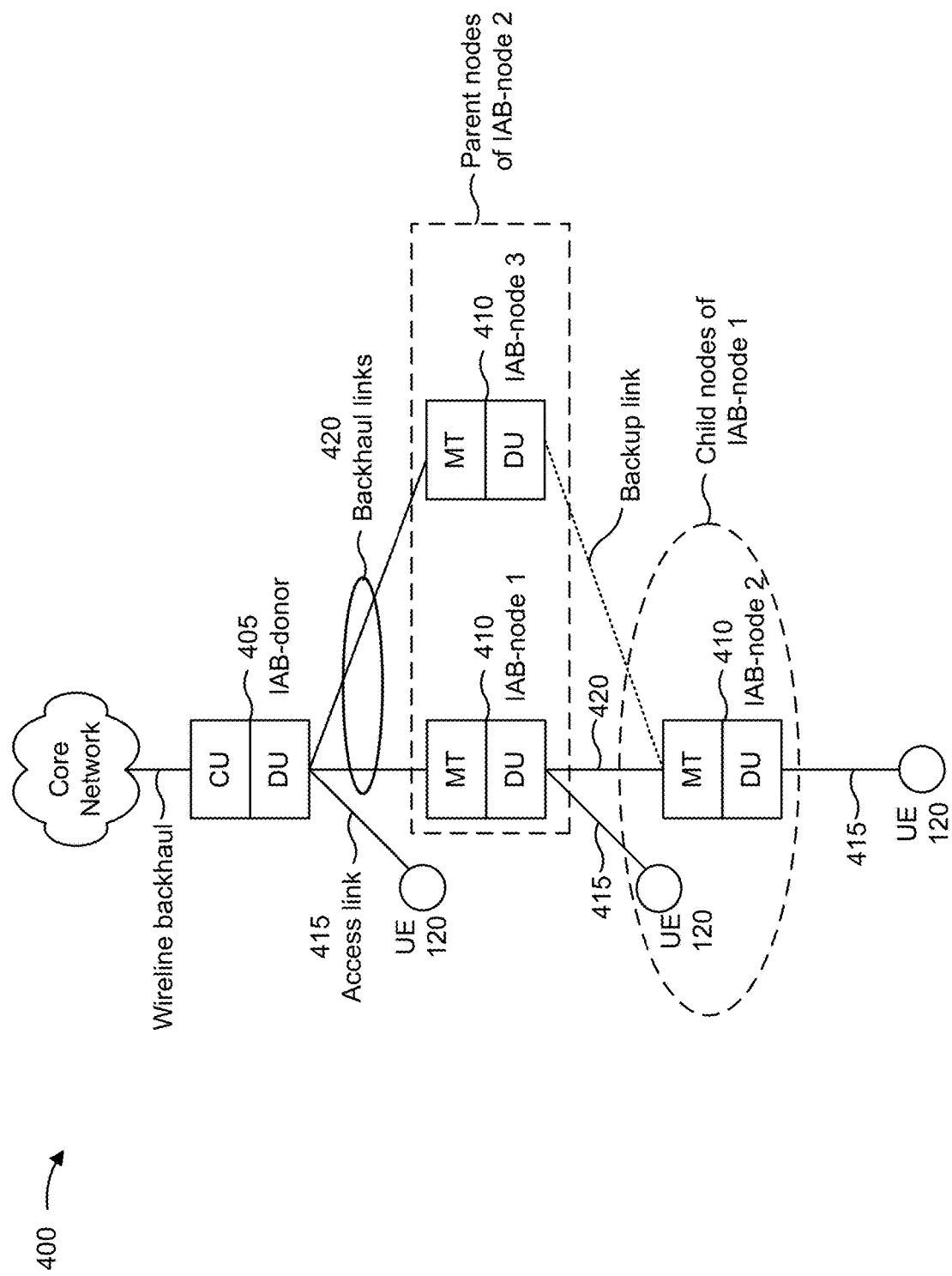
FIG. 4 is a diagram illustrating an example of an integrated access and backhaul (IAB) network architecture in accordance with the present disclosure.

FIG. 4 is a diagram illustrating an example 400 of an IAB network architecture in accordance with the present disclosure. As shown in FIG. 4, an IAB network may include an IAB donor 405 (shown as IAB-donor) that connects to a core network via a wired connection (shown as a wireline backhaul). For example, an Ng interface of an IAB donor 405 may terminate at a core network. Additionally or alternatively, an IAB donor 405 may connect to one or more devices of the core network that provide a core access and mobility management function (for example, AMF). In some aspects, an IAB donor 405 may include a base station 110, such as an anchor base station, as described above in connection with FIG. 3. As shown, an IAB donor 405 may include a central unit (CU), which may perform access node controller (ANC) functions, AMF functions, among other examples. Moreover, the CU may perform RRC layer functions, packet data convergence protocol (PDCP) layer functions, among other examples. The CU may configure a distributed unit (DU) of the IAB donor 405 or may configure one or more IAB nodes 410 (for example, a mobile termination (MT) or a DU of an IAB node 410) that connect to the core network via the IAB donor 405. A DU may perform radio link control (RLC) layer functions, medium access control (MAC) layer functions, physical (PHY) layer functions, among other examples. Thus, a CU of an IAB donor 405 may control or configure the entire IAB network that connects to the core network via the IAB donor 405, such as by using control messages or configuration messages (for example, a radio resource control (RRC) configuration message, an F1 application protocol (FLAP) message, among other examples).

As further shown in FIG. 4, the IAB network may include IAB nodes 410 (shown as IAB-node 1, IAB-node 2, and IAB-node 3) that connect to the core network via the IAB donor 405. As shown, an IAB node 410 (for example, a layer 2 (L2) relay node) may include MT functions (also sometimes referred to as UE functions (UEF)) and may include DU functions (also sometimes referred to as access node functions (ANF)). The MT functions of an IAB node 410 (for example, a child node) may be controlled or scheduled by another IAB node 410 (for example, a parent node of the child node) or by an IAB donor 405. The DU functions of an IAB node 410 (for example, a parent node) may control or schedule other IAB nodes 410 (for example, child nodes of the parent node) or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, or schedule communications of IAB nodes 410 or UEs 120. A UE 120 may include only MT functions, and not DU functions. That is, communications of a UE 120 may be controlled or scheduled by an IAB donor 405 or an IAB node 410 (for example, a parent node of the UE 120).

When a first node controls or schedules communications for a second node (for example, when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control or schedule communications for child nodes of the parent node. A parent node may be an IAB donor 405 or an IAB node 410, and a child node may be an IAB node 410 or a UE 120. Communications of an MT function of a child node may be controlled or scheduled by a parent node of the child node.

As further shown in FIG. 4, a link between a UE 120 (for example, which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (for example, time resources, frequency resources, spatial resources, among other examples) may be shared between access links 415 and backhaul links 420. In some aspects, a backhaul link 420 may be a primary backhaul link or a secondary backhaul link (for example, a backup backhaul link). In some aspects, a secondary backhaul link may be used if a primary backhaul link fails, becomes congested, becomes overloaded, among other examples. For example, a backup link 425 between IAB-node 2 and IAB-node 3 may be used for backhaul communications if a primary backhaul link between IAB-node 2 and IAB-node 1 fails. As used herein, "node" or "wireless node" may refer to an IAB donor 405 or an IAB node 410.

Figure 5:
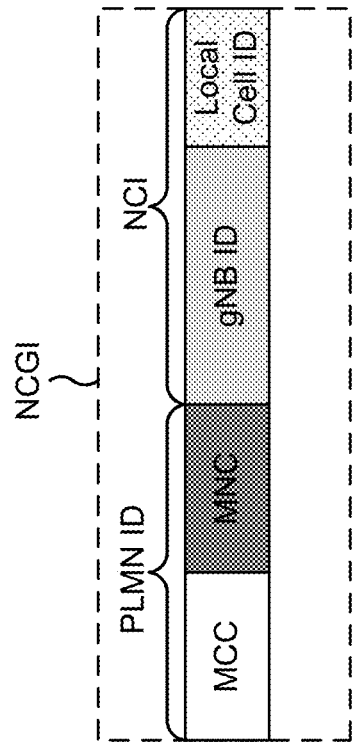
FIG. 5 is a diagram illustrating an example of a New Radio (NR) cell global identifier (NCGI) in accordance with the present disclosure.

FIG. 5 is a diagram illustrating an NR CGI (NCGI) 500 in accordance with the present disclosure. In particular, FIG. 5 shows the structure of an NCGI. In some aspects, an NCGI may be used to identify a cell at an IAB-donor DU or an IAB-node DU.

An NCGI may include a public land mobile network (PLMN) identifier (PLMN ID) and an NR cell identifier (NCI). The PLMN ID may be allocated 24 bits of the NCGI. The PLMN ID may include a mobile country code (MCC), which may be allocated 12 bits, and a mobile network code (MNC), which may be allocated 12 bits. The NCI may be allocated 36 bits of the NCGI. The NCI may include a gNB identifier (gNB ID), which may be allocated the leftmost 22 to 32 bits of the NCI, and a local cell identifier (local cell ID), which may be allocated the remaining bits of the NCI. A gNB ID may be unique for a gNB (for example, a gNB with one IAB-donor CU), and may be common to all cells (for example, at IAB-donor DUs or IAB-node DUs) served by the gNB. A PLMN ID and a gNB ID may globally identify a gNB.

In some wireless systems (for example, a 5G/NR wireless system), a PCI may be used to identify a cell. A PCI may be carried by a primary synchronization signal (PSS) or a secondary synchronization signal (SSS) in a synchronization signal block (SSB). Accordingly, a PCI may be used to determine a scrambling sequence of many physical signals or physical channels. For example, only a PCI may be used as a scrambling seed for a physical broadcast channel (PBCH), a control resource set (CORESET) 0 of a physical downlink control channel (PDCCH), a cell-specific physical downlink shared channel (PDSCH) transmission, among other examples.

In contrast to an NCGI, a PCI is limited to 1008 values in a 5G system. Accordingly, a single PCI may be associated with multiple cells in a network, such as cells that are geographically separated. In such examples, cells that are associated with the same PCI may be distinguished by NCGIs, which are unique. In some examples, multiple neighboring cells may be associated with the same PCI, which may result in a PCI collision. In a PCI collision, a UE cannot differentiate the reference signals transmitted from the multiple neighboring cells because the reference signals are scrambled based on the same PCI. PCI collision may adversely affect timing synchronization or channel estimation, and may result in decoding failure of data traffic.

Figure 6:
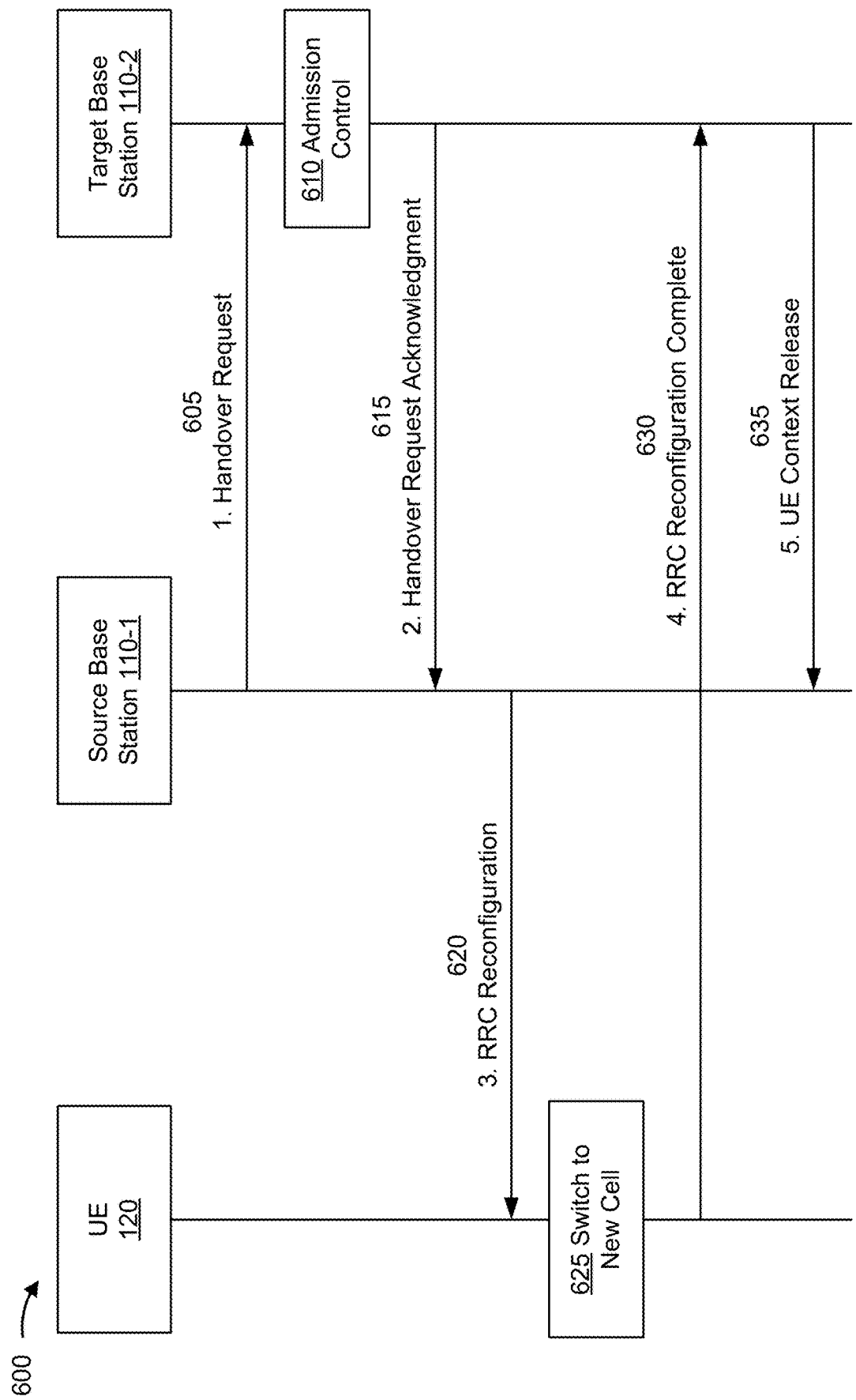
FIG. 6 is a diagram of a call flow for a handover procedure in accordance with the present disclosure.

FIG. 6 is a diagram of a call flow 600 for a handover procedure in accordance with the present disclosure. The call flow 600 may be performed by a UE 120, a source base station 110-1, and a target base station 110-2. In some aspects, the UE 120 may correspond to an IAB node 410 (for example, an MT component of an IAB node 410), as described above. In some aspects, a base station 110 may correspond to an IAB donor 405 (for example, a DU component of an IAB donor 405) or an IAB node 410 (for example, a DU component of an IAB node 410), as described above.

As shown in FIG. 6, in a first operation 605, the source base station 110-1 may initiate handover of the UE 120 to the target base station 110-2 by transmitting a handover request message to the target base station 110-2. The source base station 110-1 may transmit the handover request message to the target base station 110-2 over an Xn interface. In a second operation 610, the target base station 110-2 may perform admission control procedures associated with the handover based at least in part on receiving the handover request message. In a third operation 615, the target base station 110-2 may transmit a handover request acknowledgment message to the source base station 110-1 (for example, if the admission control procedures indicate that the target base station 110-2 can accept the handover of the UE 120). The handover request acknowledgment message may include an RRC configuration for connection to the target base station 110-2.

In a fourth operation 620, the source base station 110-1 may transmit the RRC configuration to the UE 120 by forwarding the RRC configuration of the handover request acknowledgment message to the UE 120. In a fifth operation 625, the UE 120 may change an RRC connection from the source base station 110-1 to the target base station 110-2 based at least in part on the RRC configuration. In a sixth operation 630, the UE 120 may transmit an RRC reconfiguration complete message to the target base station 110-2. The RRC reconfiguration complete message may indicate that the UE 120 has changed the RRC connection from the source base station 110-1 to the target base station 110-2. In a seventh operation 635, the target base station 110-2 may transmit a UE context release message to the source base station 110-1. The UE context release message may indicate that the handover of the UE 120 to the target base station 110-2 was successful.

Figure 7:
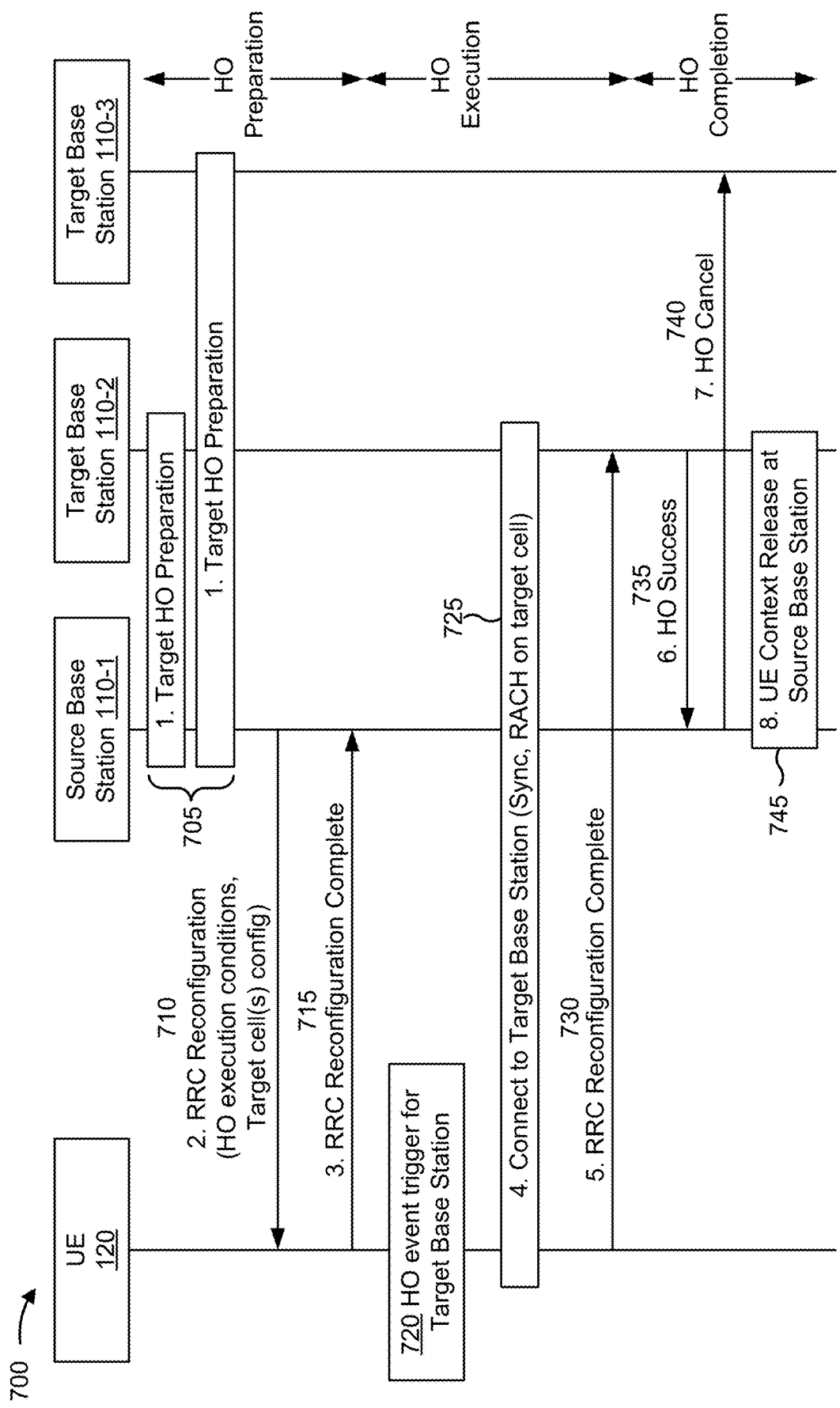
FIG. 7 is a diagram of a call flow for a conditional handover procedure in accordance with the present disclosure.

FIG. 7 is a diagram of a call flow 700 for a conditional handover procedure in accordance with the present disclosure. The call flow 700 may be performed by a UE 120, a source base station 110-1, and one or more target base stations 110-2, 110-3. In some aspects, the UE 120 may correspond to an IAB node 410 (for example, an MT component of an IAB node 410), as described above. In some aspects, a base station 110 may correspond to an IAB donor 405 (for example, a DU component of an IAB donor 405) or an IAB node 410 (for example, a DU component of an IAB node 410), as described above.

As shown in FIG. 7, in a first operation 705, the source base station 110-1 may communicate with a first target base station 110-2 and a second target base station 110-3 to prepare the first and second target base stations 110-2, 110-3 for a conditional handover (HO) of the UE 120. For example, the source base station 110-1 may transmit a handover request message to the first target base station 110-2 or the second target base station 110-3, and the first target base station 110-2 or the second target base station 110-3 may transmit a handover request acknowledgment message to the source base station 110-1, as described above in connection with FIG. 6. In a second operation 710, the source base station 110-1 may transmit an RRC reconfiguration message to the UE 120. The RRC reconfiguration message may include a conditional handover configuration that indicates configurations for the candidate target base stations 110-2, 110-3, indicates one or more criteria (for example, conditional thresholds) that trigger handover, among other examples. In a third operation 715, the UE 120 may transmit an RRC reconfiguration complete message to the source base station 110-1, which may indicate that the UE 120 has applied the RRC reconfiguration (for example, the conditional handover configuration).

In a fourth operation 720, the UE 120 may detect a conditional handover event for the first target base station 110-2. For example, the UE 120 may determine that the one or more criteria for triggering handover to the first target base station 110-2 are satisfied. In a fifth operation 725, the UE 120 may change an RRC connection from the source base station 110-1 to the first target base station 110-2, as described above in connection with FIG. 6, based at least in part on detecting the conditional handover event for the first target base station 110-2. That is, the UE 120 may execute the handover upon detecting the conditional handover event, and does not wait for an RRC reconfiguration message from the source base station 110-1. This may reduce handover latency.

In a sixth operation 730, the UE 120 may transmit an RRC reconfiguration complete message to the first target base station 110-2. The RRC reconfiguration complete message may indicate that the UE 120 has changed an RRC connection from the source base station 110-1 to the first target base station 110-2, as described above in connection with FIG. 6. In a seventh operation 735, the first target base station 110-2 may transmit a handover success message (for example, indicating successful handover of the UE 120) to the source base station 110-1. In an eighth operation 740, the source base station 110-1 may transmit a handover cancel message to the second target base station 110-2. The handover cancel message may indicate that the second target base station 110-2 is to discard a handover request message of the first operation 705. In a ninth operation 745, the source base station 110-1 and the first target base station 110-2 may perform a UE context release procedure to release the UE 120 context at the source base station 110-1.

In some examples, a cell served by the source base station 110-1 may be associated with a first PCI and a cell served by the first target base station 110-2 may be associated with a second PCI. Accordingly, the conditional handover configuration may identify the cell served by the first target base station 110-2 by the second PCI. Moreover, the UE 120 may perform measurements on reference signals associated with the second PCI in order to determine the occurrence of the conditional handover event for the first target base station 110-2. However, in some other examples, the cell served by the source base station 110-1 and the cell served by the first target base station 110-2 may be associated with the same PCI. That is, the cells served by the source base station 110-1 and the first target base station 110-2 may be associated with a PCI collision. In such examples, the conditional handover configuration cannot differentiate between a cell served by the source base station 110-1 and a cell served by the first target base station 110-2. Moreover, the UE 120 cannot differentiate between reference signals transmitted on a cell served by the source base station 110-1 and reference signals transmitted on a cell served by the first target base station 110-2 in order to determine the occurrence of the conditional handover event for the first target base station 110-2.

Figure 8:
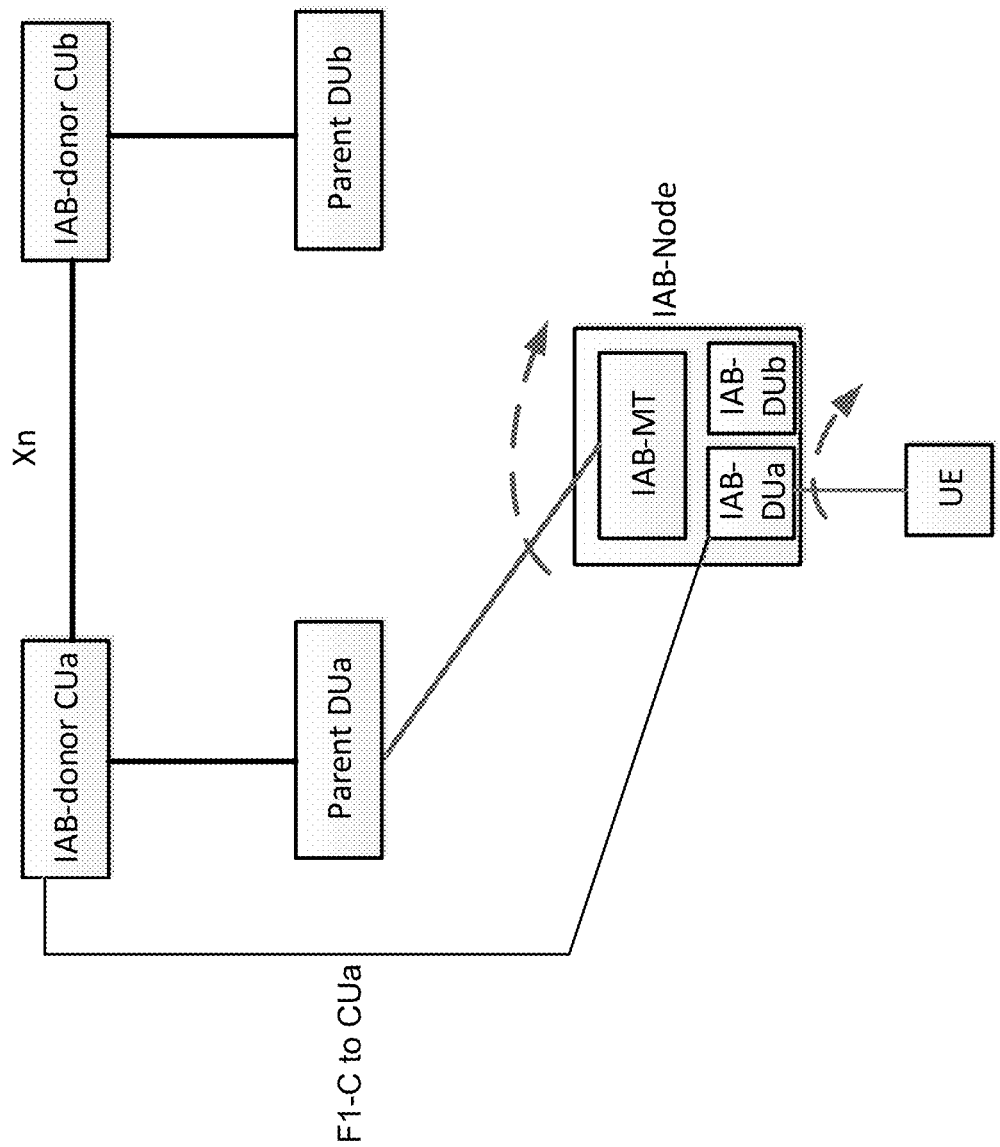
FIG. 8 is a diagram illustrating an example of handover in an IAB network in accordance with the present disclosure.

FIG. 8 is a diagram illustrating an example of handover in an IAB network in accordance with the present disclosure. As shown in FIG. 8, an IAB-node may be connected to a cell served by a first parent DU (Parent DUa), and the first parent DU (Parent DUa) may be connected to a first IAB-donor CU (IAB-donor CUa). Additionally, the first parent DU (Parent DUa) may hand over the IAB-node to a second parent DU (Parent DUb), and the second parent DU (Parent DUb) may be connected to a second IAB-donor CU (IAB-donor CUb). That is, the first parent DU (Parent DUa) may hand over an MT component (IAB-MT) of the IAB-node to the second parent DU (Parent DUb). In some examples, the IAB-node may include a first DU component (IAB-DUa) that is associated with the first IAB-donor CU (IAB-donor CUa), and a second DU component (IAB-DUb) that is associated with the second IAB-donor CU (IAB-donor CUb). Accordingly, the DU of the IAB-node may migrate from the first DU component (IAB-DUa) to the second DU component (IAB-DUb) in connection with the handover of the MT component (IAB-MT). In connection with the migration of the DU to the second DU component (IAB-DUb), the IAB-node DU may not change PCI, but may change and broadcast a new cell identity (for example, an NCGI). However, current wireless networks may not enable handover of a UE connected to the IAB-node from the first DU component (IAB-DUa) to the second DU component (IAB-DUb) when there is not a change in PCI.

Various aspects relate generally to conditional handover of a UE based at least in part on a CGI (for example, an NCGI). Some aspects more specifically relate to conditional handover of a UE based at least in part on a change of a CGI without a change in a PCI. In some aspects, a UE, connected to a first cell associated with a PCI and a first CGI, may receive an indication (for example, a conditional handover configuration) to connect to a second cell, associated with the same PCI and a second CGI, upon detecting the second CGI in a system information message associated with the PCI. In some aspects, the UE may connect to the second cell based at least in part on detecting the second CGI in the system information message associated with the PCI.

Particular aspects of the subject matter described in this disclosure can be implemented to realize one or more of the following potential advantages. In some examples, the described techniques can be used to support conditional handover (for example, support conditional reconfiguration with synchronization) for a UE based at least in part on a change of a CGI rather than a change of a PCI. In this way, the UE may be configured with a handover command prior to loss of a source path. Moreover, reconfiguration messages during the handover (such as those described above in connection with FIG. 6) may be eliminated, thereby reducing handover latency. This may be useful in an IAB network where conditional handover commands can be configured for multiple child UEs or MT components that are connected to an IAB-node.

Figure 9:
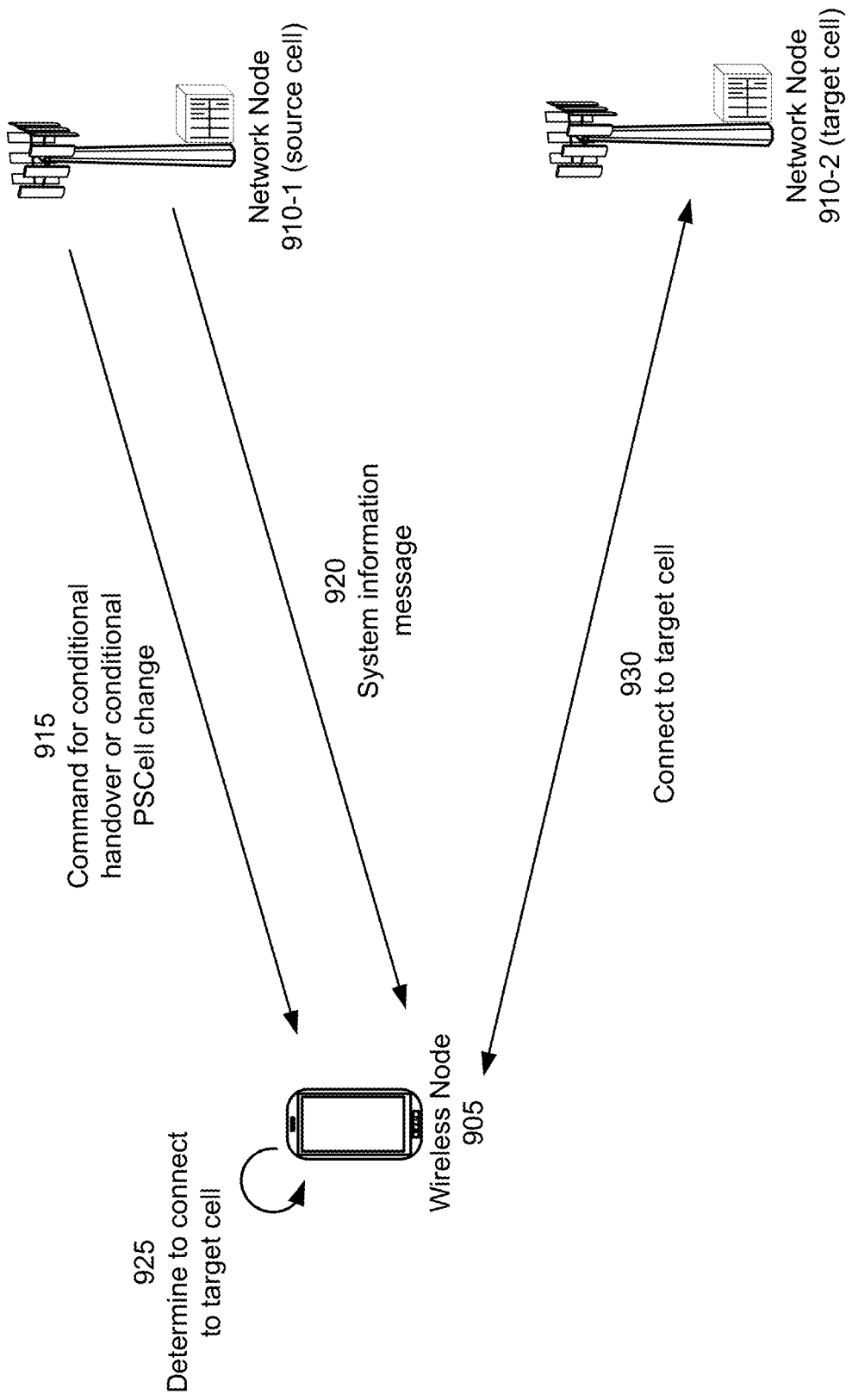
FIG. 9 is a diagram illustrating an example associated with conditional handover using cell global identifiers (CGIs) in accordance with the present disclosure.

FIG. 9 is a diagram illustrating an example associated with conditional handover using CGIs in accordance with the present disclosure. As shown, the example of FIG. 9 includes a wireless node 905, a first network node 910-1, and a second network node 910-2. In some examples, the first network node 910-1 may serve a source cell (that is, a cell to which the wireless node 905 is currently connected) and the second network node 910-2 may serve a target cell (that is, a candidate cell to which the wireless node 905 may connect). That is, the source cell and the target cell may be served by different network nodes. In some other examples, the source cell and the target cell may be served by the same network node (for example, one of the first network node 910-1 or the second network node 910-2).

In some aspects, the wireless node 905 may correspond to a UE 120, an IAB-node 410 (for example, an MT component of an IAB-node 410), among other examples. In some aspects, the wireless node 905 may be a network node. In some aspects, a network node 910 may correspond to a base station 110, a DU, an IAB-node 410 (for example, a DU component of an IAB-node 410), an IAB-donor 405 (for example, a DU component of an IAB-donor 405), among other examples. For example, a network node 910 may be a gNB, a gNB-DU, an eNB, an IAB-node, an IAB-donor, among other examples. In some aspects, a network node 910 may be a wireless node.

In some aspects, the source cell may be a serving cell for the wireless node 905. In some aspects, the wireless node 905 may be operating in a dual connectivity mode (for example, a multiple RAT dual connectivity (MR-DC) mode, an Evolved UMTS Terrestrial Radio Access Network (E-UTRAN)-NR dual connectivity (EN-DC) mode, among other examples), and the source cell may be a primary secondary cell (PSCell) for the wireless node 905.

In some aspects, the source cell and the target cell may be associated with the same PCI, which may be referred to herein as a shared PCI. In some aspects, the source cell may be associated with a first CGI (for example, a first NCGI), and the target cell may be associated with a second CGI (for example, a second NCGI). In some aspects, the first CGI and the second CGI may include different PLMN IDs, different cell identifiers, different base station identifiers, different local cell identifiers, among other examples. For example, the first NCGI and the second NCGI may include different PLMN IDs, different NCIs, different gNB IDs, different local cell identifiers, among other examples.

In some aspects, the first network node 910-1 and the second network node 910-2 may communicate in connection with preparing the target cell for conditional handover or PSCell change. For example, the first network node 910-1 may transmit a handover request message to the second network node 910-2, and the second network node 910-2 may transmit a handover request acknowledgment message to the first network node 910-1, as described above in connection with FIGS. 6 and 7. In some aspects, the same network node 910 may serve the source cell and the target cell, as described above.

As shown in FIG. 9, in a first operation 915, the first network node 910-1 may transmit, and the wireless node 905 may receive, a message (for example, a configuration message) that includes a command for a conditional handover from the source cell to the target cell or a command for a conditional PSCell change from the source cell to the target cell. That is, the message may include a conditional configuration for handover or PSCell change. In some other examples, another network node, such as another serving node of the wireless node 905, may transmit the message to the wireless node 905. In some other examples, such as when the wireless node 905 is operating in a dual connectivity mode, a master node (MN) or a secondary node (SN) may transmit the message to the wireless node 905. In other words, a conditional configuration for PSCell change may be MN-initiated or SN-initiated. In some aspects, the wireless node 905 may receive the message while the wireless node 905 is connected to, or otherwise served on, the source cell, and the wireless node 905 may transmit another message indicating that the wireless node 905 has applied the command for the conditional handover from the source cell to the target cell or the command for the conditional PSCell change from the source cell to the target cell (for example, the message may indicate that the wireless node 905 has applied the configuration for handover or PSCell change).

In some aspects, the message may be an RRC reconfiguration message. For example, the message may be an RRC reconfiguration message that indicates RRC reconfiguration with synchronization (that is, the message may be an RRC reconfiguration with sync message). As another example, the message may be an RRC reconfiguration message that indicates RRC reconfiguration without synchronization (that is, the message may be an RRC reconfiguration without sync message). In some aspects, an MN or an SN may transmit the message, as described above, via a signaling radio bearer 1 (SRB1) or a signaling radio bearer 3 (SRB3). In some aspects, the message may include a security key update for the wireless node 905.

In some aspects, the conditional configuration for handover or PSCell change in the message may include an indication that the wireless node 905 is to connect to the target cell responsive to detecting the second CGI (which is associated with the target cell) in a system information message associated with the shared PCI (which is associated with the source cell and the target cell). That is, the indication may indicate that the wireless node 905 is to connect to the target cell conditioned on detecting the second CGI in a system information message associated with the shared PCI. In some aspects, the system information message may be a system information block 1 (SIB1) message.

In some aspects, the conditional configuration for handover or PSCell change in the message may indicate one or more additional criteria (that is, additional conditions) for handover or PSCell change from the source cell to the target cell. That is, the indication that the wireless node 905 is to connect to the target cell responsive to detecting the second CGI in a system information message associated with the shared PCI may be further conditioned on satisfaction of the one or more additional criteria. The one or more additional criteria for handover or PSCell change may be referred to as triggering conditions for handover or PSCell change.

In some aspects, a criterion may indicate a time limit (for example, a time limit measured from reception of the conditional configuration) for detection of the second CGI in the system information message. Thus, the criterion is satisfied if the wireless node 905 detects the second CGI in the system information message before the time limit. In some aspects, a criterion may indicate a threshold value for a channel quality metric associated with a reference signal, such as an SSB associated with the shared PCI, a channel state information reference signal (CSI-RS), among other examples. Thus, the criterion is satisfied if the channel quality metric satisfies the threshold value. The channel quality metric may be a signal to noise ratio (SNR), a signal to interference plus noise ratio (SINR), a channel quality indicator (CQI) value, a precoding matrix indicator (PMI) value, a layer indicator (LI) value, a rank indicator (RI)

value, a reference signal received power (RSRP) value, a reference signal received quality (RSRQ) value, among other examples. In some aspects, the conditional configuration may indicate a time duration (for example, a start time) after which the wireless node 905 is to begin monitoring for the second CGI in a system information message associated with the shared PCI.

In some aspects, the conditional configuration for handover or PSCell change in the message may indicate multiple candidate cells for handover or PSCell change. For example, the conditional configuration for handover or PSCell change may indicate the target cell and one or more additional target cells. In some aspects, an additional target cell may be associated with a third CGI (for example, a third NCGI) and the shared PCI. Accordingly, the conditional configuration may indicate that the wireless node 905 is to connect to the additional target cell responsive to detecting the third CGI in a system information message associated with the shared PCI. In some aspects, an additional target cell may be associated with a third CGI (for example, a third NCGI) and a different PCI than the shared PCI. Accordingly, the conditional configuration may indicate that the wireless node 905 is to connect to the additional target cell responsive to detecting a system information message associated with the different PCI or responsive to detecting the third CGI in a system information message associated with the shared PCI.

In some aspects, the multiple candidate cells may be associated with respective (for example, independent) measurement configurations. For example, the wireless node 905 may use a first measurement configuration for a first candidate cell, use a second measurement configuration for a second candidate cell, and so forth. In some aspects, the multiple candidate cells may be associated with respective (for example, independent) criteria for handover or PSCell change (that is, respective triggering conditions for handover or PSCell change). For example, the conditional configuration may indicate that the wireless node 905 is to connect to a first candidate cell responsive to satisfaction of one or more first criteria (for example, a first time limit, a first threshold value for a channel quality metric, among other examples, as described above), that the wireless node 905 is to connect to a second candidate cell responsive to satisfaction of one or more second criteria (for example, a second time limit, a second threshold value for a channel quality metric, among other examples, as described above), and so forth.

In some aspects, the first network node 910-1 (or another serving node) may transmit, and the wireless node 905 may receive, another message that indicates that the conditional configuration is to be canceled (for example, discarded by the wireless node 905). That is, the other message may indicate that the wireless node 905 is not to connect to the target cell responsive to detecting the second CGI in a system information message associated with the shared PCI. In some other aspects, the first network node 910-1 (or another serving node) may transmit, and the wireless node 905 may receive, another message that indicates that the conditional configuration is to be modified. That is, the other message may indicate a modification to one or more parameters of the conditional configuration. For example, the other message may indicate a modification to a list of multiple candidate cells for handover or PSCell change (for example, by indicating one or more CGIs or PCIs that are to be added to, or removed from, the list), a modification to one or more measurement configurations, a modification to one or more triggering conditions for handover or PSCell change, among other examples.

In a second operation 920, the first network node 910-1 (or another serving node or the second network node 910-2) may transmit, and the wireless node 905 may receive, a system information message, associated with the shared PCI, that includes the second CGI (which is associated with the target cell). In some aspects, the first network node 910-1 (or another serving node or the second network node 910-2) may broadcast the system information message that includes the second CGI. That is, the system information message may be a broadcast message. In some other aspects, the first network node 910-1 (or another serving node or the second network node 910-2) may transmit the system information message, that includes the second CGI, to the wireless node 905 in a dedicated manner (for example, via an RRC message). That is, the system information message may be a dedicated message for the wireless node 905 (for example, the system information message may be a unicast message).

In some aspects, the first network node 910-1 (or another serving node) may transmit, and the wireless node 905 may receive, a short message (for example, a downlink control information message) that indicates that system information has changed. Accordingly, the wireless node 905 may receive, or otherwise acquire, the system information message that includes the second CGI based at least in part on receiving the short message. In some aspects, the first network node 910-1 (or another serving node) may transmit, and the wireless node 905 may receive, a page that indicates that system information has changed. Accordingly, the wireless node 905 may receive, or otherwise acquire, the system information message that includes the second CGI based at least in part on receiving the page.

In a third operation 925, the wireless node 905 may determine to connect to the target cell based at least in part on receiving the system information message, associated with the shared PCI, that includes the second CGI. For example, the wireless node 905 may monitor system information, and may determine to connect to the target cell responsive to detecting the second CGI in the system information message (that is, in accordance with the condition for handover or PSCell change indicated in the conditional configuration). In some aspects, the wireless node 905 may determine to connect to the target cell further based at least in part on a determination that one or more criteria (that is, one or more triggering conditions), for handover or PSCell change to the target cell, are satisfied. For example, the wireless node 905 may determine to connect to the target cell based at least in part on a determination that the second CGI was detected in the system information message within a time limit for detection of the second CGI. As another example, the wireless node 905 may determine to connect to the target cell based at least in part on a determination that a channel quality metric for a reference signal satisfies a threshold value.

In a fourth operation 930, the wireless node 905 may connect to the target cell. For example, the wireless node 905 may communicate with the second network node 910-2 to connect to the target cell. In some aspects, the wireless node 905 may execute a handover or a PSCell change from the source cell to the target cell by changing an RRC connection from the source cell to the target cell, as described above in connection with FIGS. 6 and 7. In some aspects, the wireless node 905 may connect to the target cell with synchronization (for example, the wireless node 905 may perform a synchronization procedure with the target cell) or without synchronization (for example, when the source cell and the target cell are served by the same network node 910). In some aspects, the wireless node 905 may perform a random access channel (RACH) procedure with the second network node 910-2 to connect to the target cell. In this way, the wireless node 905 may connect to the target cell in accordance with a conditional handover or PSCell change command, thereby reducing latency associated with handover or PSCell change. Moreover, as described above, the conditional handover or PSCell change may be based at least in part on CGIs rather than PCIs, which may be useful when the source cell and the target cell are associated with a PCI collision.

Figure 10:
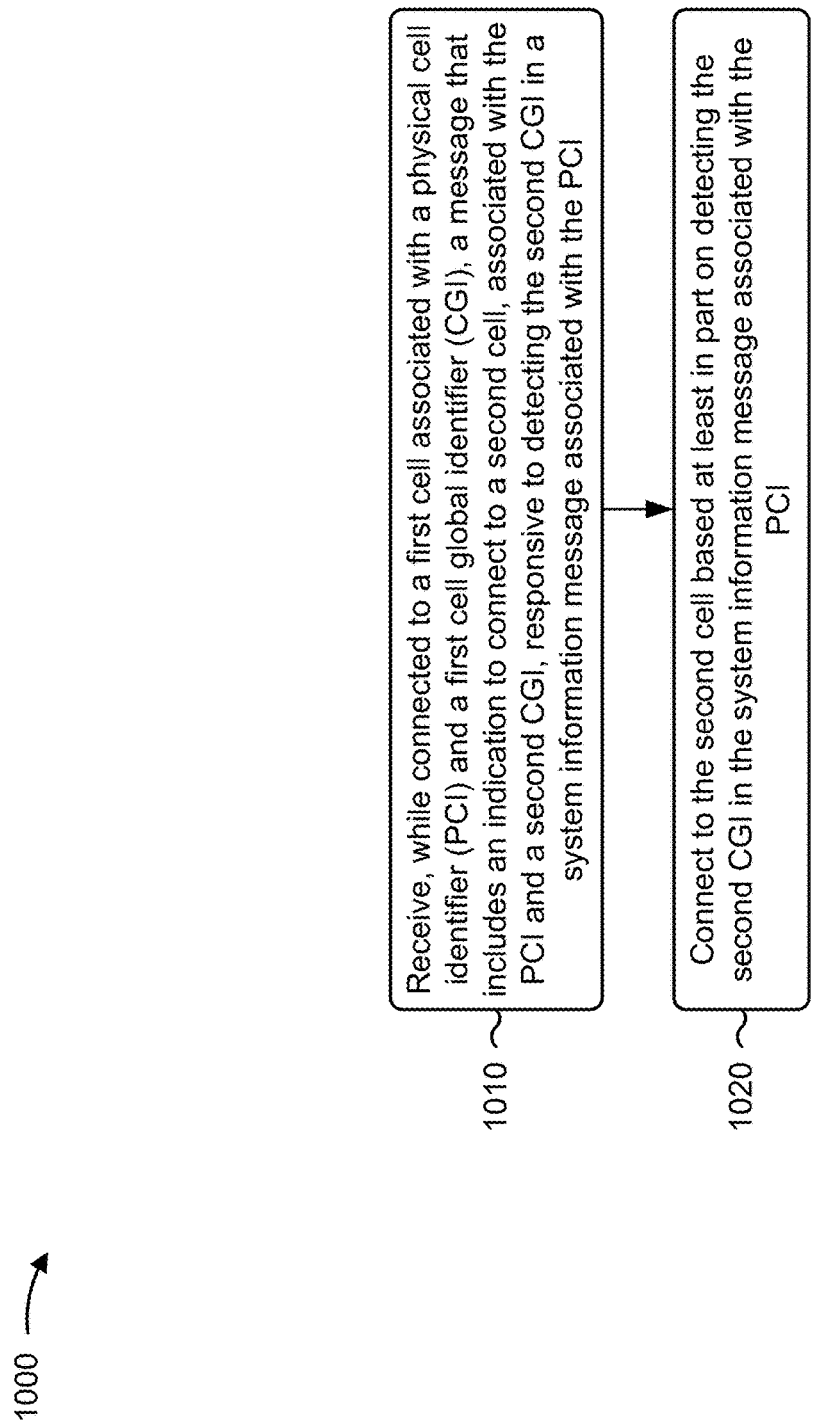
FIG. 10 is a flowchart illustrating an example process performed by a wireless node in accordance with the present disclosure.

FIG. 10 is a flowchart illustrating an example process 1000 performed, for example, by a wireless node in accordance with the present disclosure. Example process 1000 is an example where the wireless node (for example, wireless node 905, among other examples) performs operations associated with conditional handover using CGIs.

As shown in FIG. 10, in some aspects, process 1000 may include receiving, while connected to a first cell associated with a PCI and a first CGI, a message that includes an indication to connect to a second cell, associated with the PCI and a second CGI, responsive to detecting the second CGI in a system information message associated with the PCI (block 1010). For example, the wireless node (for example, using antenna 252, DEMOD 254, MIMO detector 256, receive processor 258, controller/processor 280, or another component) may receive, while connected to a first cell associated with a PCI and a first CGI, a message that includes an indication to connect to a second cell, associated with the PCI and a second CGI, responsive to detecting the second CGI in a system information message associated with the PCI, as described above.

As further shown in FIG. 10, in some aspects, process 1000 may include connecting to the second cell based at least in part on detecting the second CGI in the system information message associated with the PCI (block 1020). For example, the wireless node (for example, using antenna 252, DEMOD 254, MIMO detector 256, receive processor 258, controller/processor 280, transmit processor 264, TX MIMO processor 266, MOD 254, or another component) may connect to the second cell based at least in part on detecting the second CGI in the system information message associated with the PCI, as described above.

Process 1000 may include additional aspects, such as any single aspect or any combination of aspects described below or in connection with one or more other processes described elsewhere herein.

In a first aspect, the first cell or the second cell is served by a gNodeB, a gNodeB distributed unit, an eNodeB, an IAB node, or an IAB donor.

In a second additional aspect, alone or in combination with the first aspect, the first cell and the second cell are served by a same network node.

In a third additional aspect, alone or in combination with one or more of the first and second aspects, the first cell and the second cell are served by different network nodes.

In a fourth additional aspect, alone or in combination with one or more of the first through third aspects, the wireless node is a UE.

In a fifth additional aspect, alone or in combination with one or more of the first through fourth aspects, the wireless node is an MT component of an IAB node.

In a sixth additional aspect, alone or in combination with one or more of the first through fifth aspects, the first CGI and the second CGI include at least one of different PLMN identifiers, different cell identifiers, different base station identifiers, or different local cell identifiers.

In a seventh additional aspect, alone or in combination with one or more of the first through sixth aspects, the message is an RRC reconfiguration message that indicates RRC reconfiguration with synchronization or without synchronization.

In an eighth additional aspect, alone or in combination with one or more of the first through seventh aspects, the message further includes a security key update for the wireless node.

In a ninth additional aspect, alone or in combination with one or more of the first through eighth aspects, the indication is a command for a conditional handover from the first cell to the second cell. Here, process 1000 may include determining to connect to the second cell based at least in part on a determination that a condition for the conditional handover from the first cell to the second cell is satisfied. For example, process 100 may include determining to connect to the second cell based at least in part on detecting the second CGI in the system information message associated with the PCI.

In a tenth additional aspect, alone or in combination with one or more of the first through ninth aspects, the indication is a command for a conditional PSCell change from the first cell to the second cell. Here, process 1000 may include determining to connect to the second cell based at least in part on a determination that a condition for the conditional PSCell change from the first cell to the second cell is satisfied. For example, process 100 may include determining to connect to the second cell based at least in part on detecting the second CGI in the system information message associated with the PCI.

In an eleventh additional aspect, alone or in combination with one or more of the first through tenth aspects, the indication further indicates that the wireless node is to connect to the second cell based at least in part on satisfaction of one or more criteria. Here, process 1000 may include determining to connect to the second cell based at least in part on a determination that the one or more criteria are satisfied.

In a twelfth additional aspect, alone or in combination with one or more of the first through eleventh aspects, the indication further indicates that the wireless node is to connect to a third cell, associated with a third CGI and the PCI or another PCI, responsive to detecting the third CGI in the system information message associated with the PCI or responsive to detecting a system information message associated with the other PCI.

In a thirteenth additional aspect, alone or in combination with one or more of the first through twelfth aspects, the second cell is one of a plurality of candidate cells indicated by the indication, and the plurality of candidate cells are associated with respective measurement configurations. Here, process 1000 may include receiving respective measurement configurations for the plurality of candidate cells.

In a fourteenth additional aspect, alone or in combination with one or more of the first through thirteenth aspects, the second cell is one of a plurality of candidate cells indicated by the indication, and the plurality of candidate cells are associated with respective criteria for conditional handover or conditional primary secondary cell change. Here, process 1000 may include receiving respective criteria for the plurality of candidate cells.

In a fifteenth additional aspect, alone or in combination with one or more of the first through fourteenth aspects, the indication further indicates that the wireless node is to begin monitoring for the second CGI in the system information message associated with the PCI after a time duration. Here, process 1000 may include monitoring system information for the second CGI (for example, after the time duration).

In a sixteenth additional aspect, alone or in combination with one or more of the first through fifteenth aspects, process 1000 includes receiving another message that indicates that the wireless node is not to follow the indication. Here, process 1000 may include discarding the indication based at least in part on receiving the other message.

In a seventeenth additional aspect, alone or in combination with one or more of the first through sixteenth aspects, process 1000 includes receiving another message that indicates that the wireless node is to modify one or more parameters of the indication. Here, process 1000 may include modifying one or more parameters of the indication based at least in part on receiving the other message.

In an eighteenth additional aspect, alone or in combination with one or more of the first through seventeenth aspects, the system information message is a broadcast message. Here, process 1000 may include receiving the system information message in the broadcast message.

In a nineteenth additional aspect, alone or in combination with one or more of the first through eighteenth aspects, the system information message is a dedicated message for the wireless node. Here, process 1000 may include receiving the system information message in the dedicated message.

In a twentieth additional aspect, alone or in combination with one or more of the first through nineteenth aspects, process 1000 includes receiving at least one of a page or a short message that indicates a change of system information, and receiving the system information message based at least in part on the receiving the at least one of the page or the short message.

Although FIG. 10 shows example blocks of process 1000, in some aspects, process 1000 may include additional blocks, fewer blocks, different blocks, or differently arranged blocks than those depicted in FIG. 10. Additionally or alternatively, two or more of the blocks of process 1000 may be performed in parallel.

Figure 11:
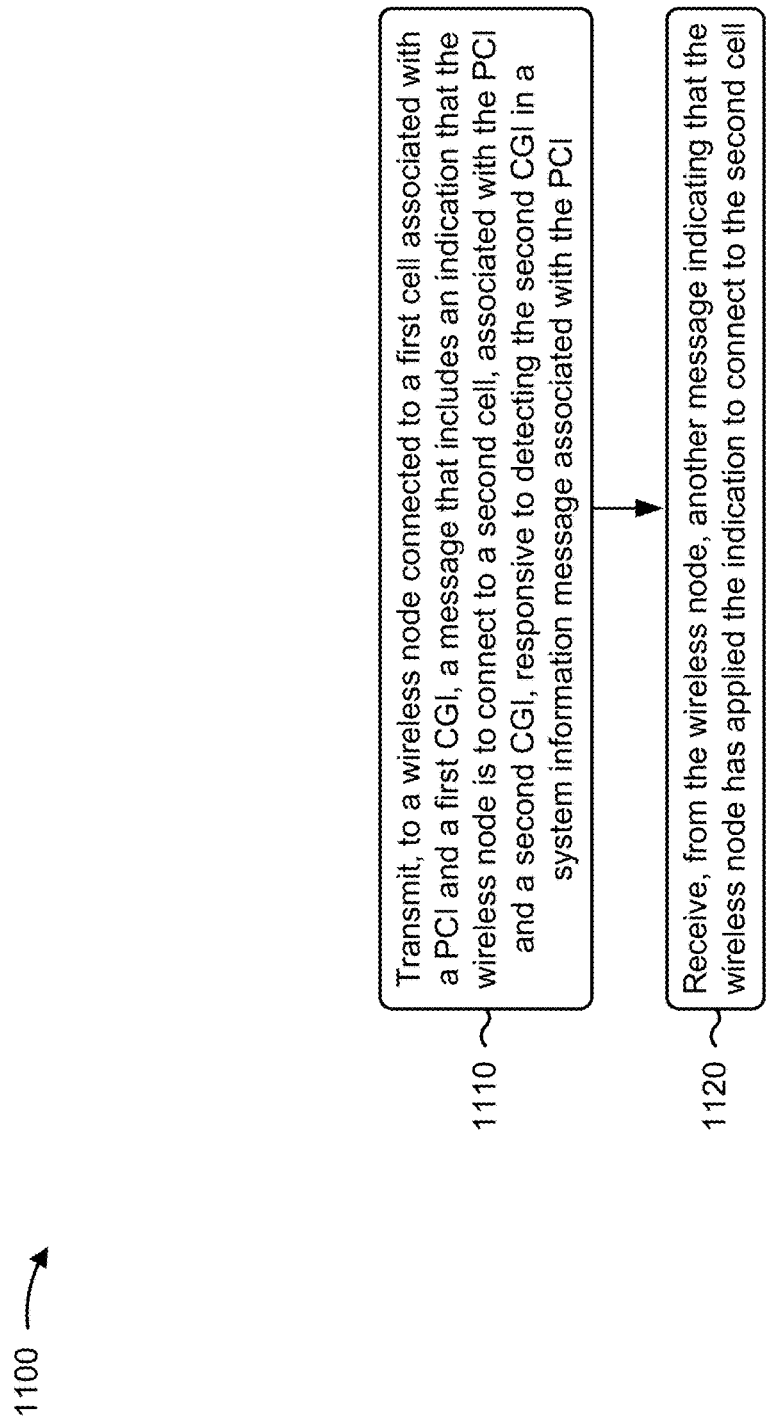
FIG. 11 is a flowchart illustrating an example process performed by a network node in accordance with the present disclosure.

FIG. 11 is a flowchart illustrating an example process 1100 performed, for example, by a network node in accordance with the present disclosure. Example process 1100 is an example where the network node (for example, network node 910-1, among other examples) performs operations associated with conditional handover using CGIs.

As shown in FIG. 11, in some aspects, process 1100 may include transmitting, to a wireless node connected to a first cell associated with a PCI and a first CGI, a message that includes an indication that the wireless node is to connect to a second cell, associated with the PCI and a second CGI, responsive to detecting the second CGI in a system information message associated with the PCI (block 1110). For example, the network node (for example, using controller/processor 240, transmit processor 220, TX MIMO processor 230, MOD 232, antenna 234, or another component) may transmit, to a wireless node connected to a first cell associated with a PCI and a first CGI, a message that includes an indication that the wireless node is to connect to a second cell, associated with the PCI and a second CGI, responsive to detecting the second CGI in a system information message associated with the PCI, as described above.

As further shown in FIG. 11, in some aspects, process 1100 may include receiving, from the wireless node, another message indicating that the wireless node has applied the indication to connect to the second cell (block 1120). For example, the network node (for example, using antenna 234, DEMOD 232, MIMO detector 236, receive processor 238, controller/processor 240, memory 242, or another component) may receive, from the wireless node, another message indicating that the wireless node has applied the indication to connect to the second cell, as described above.

Process 1100 may include additional aspects, such as any single aspect or any combination of aspects described below or in connection with one or more other processes described elsewhere herein.

In a first aspect, the first cell or the second cell is served by a gNodeB, a gNodeB distributed unit, an eNodeB, an IAB node, or an IAB donor.

In a second additional aspect, alone or in combination with the first aspect, the first cell and the second cell are served by a same network node.

In a third additional aspect, alone or in combination with one or more of the first and second aspects, the first cell and the second cell are served by different network nodes.

In a fourth additional aspect, alone or in combination with one or more of the first through third aspects, the wireless node is a UE.

In a fifth additional aspect, alone or in combination with one or more of the first through fourth aspects, the wireless node is an MT component of an IAB node.

In a sixth additional aspect, alone or in combination with one or more of the first through fifth aspects, the first CGI and the second CGI include at least one of different PLMN identifiers, different cell identifiers, different base station identifiers, or different local cell identifiers.

In a seventh additional aspect, alone or in combination with one or more of the first through sixth aspects, the message is an RRC reconfiguration message that indicates RRC reconfiguration with synchronization or without synchronization.

In an eighth additional aspect, alone or in combination with one or more of the first through seventh aspects, the message further includes a security key update for the wireless node.

In a ninth additional aspect, alone or in combination with one or more of the first through eighth aspects, the indication is a command for a conditional handover from the first cell to the second cell.

In a tenth additional aspect, alone or in combination with one or more of the first through ninth aspects, the indication is a command for a conditional primary secondary cell change from the first cell to the second cell.

In an eleventh additional aspect, alone or in combination with one or more of the first through tenth aspects, the indication further indicates that the wireless node is to connect to the second cell based at least in part on satisfaction of one or more criteria.

In a twelfth additional aspect, alone or in combination with one or more of the first through eleventh aspects, the indication further indicates that the wireless node is to connect to a third cell, associated with a third CGI and the PCI or another PCI, responsive to detecting the third CGI in the system information message associated with the PCI or responsive to detecting a system information message associated with the other PCI.

In a thirteenth additional aspect, alone or in combination with one or more of the first through twelfth aspects, the second cell is one of a plurality of candidate cells indicated by the indication, and the plurality of candidate cells are associated with respective measurement configurations. Here, process 1100 may include transmitting respective measurement configurations for the plurality of candidate cells.

In a fourteenth additional aspect, alone or in combination with one or more of the first through thirteenth aspects, the second cell is one of a plurality of candidate cells indicated by the indication, and the plurality of candidate cells are associated with respective criteria for conditional handover or conditional primary secondary cell change. Here, process 1100 may include transmitting respective criteria for the plurality of candidate cells.

In a fifteenth additional aspect, alone or in combination with one or more of the first through fourteenth aspects, the indication indicates that the wireless node is to begin monitoring for the second CGI in the system information message associated with the PCI after a time duration.

In a sixteenth additional aspect, alone or in combination with one or more of the first through fifteenth aspects, process 1100 includes transmitting another message that indicates that the wireless node is not to follow the indication.

In a seventeenth additional aspect, alone or in combination with one or more of the first through sixteenth aspects, process 1100 includes transmitting another message that indicates that the wireless node is to modify one or more parameters of the indication.

In an eighteenth additional aspect, alone or in combination with one or more of the first through seventeenth aspects, the system information message is a broadcast message. Here, process 1100 may include transmitting the system information message in the broadcast message.

In a nineteenth additional aspect, alone or in combination with one or more of the first through eighteenth aspects, the system information message is a dedicated message for the wireless node. Here, process 1100 may include transmitting the system information message in the dedicated message.

In a twentieth additional aspect, alone or in combination with one or more of the first through nineteenth aspects, process 1100 includes transmitting at least one of a page or a short message that indicates a change of system information.

Although FIG. 11 shows example blocks of process 1100, in some aspects, process 1100 may include additional blocks, fewer blocks, different blocks, or differently arranged blocks than those depicted in FIG. 11. Additionally or alternatively, two or more of the blocks of process 1100 may be performed in parallel.

Figure 12:
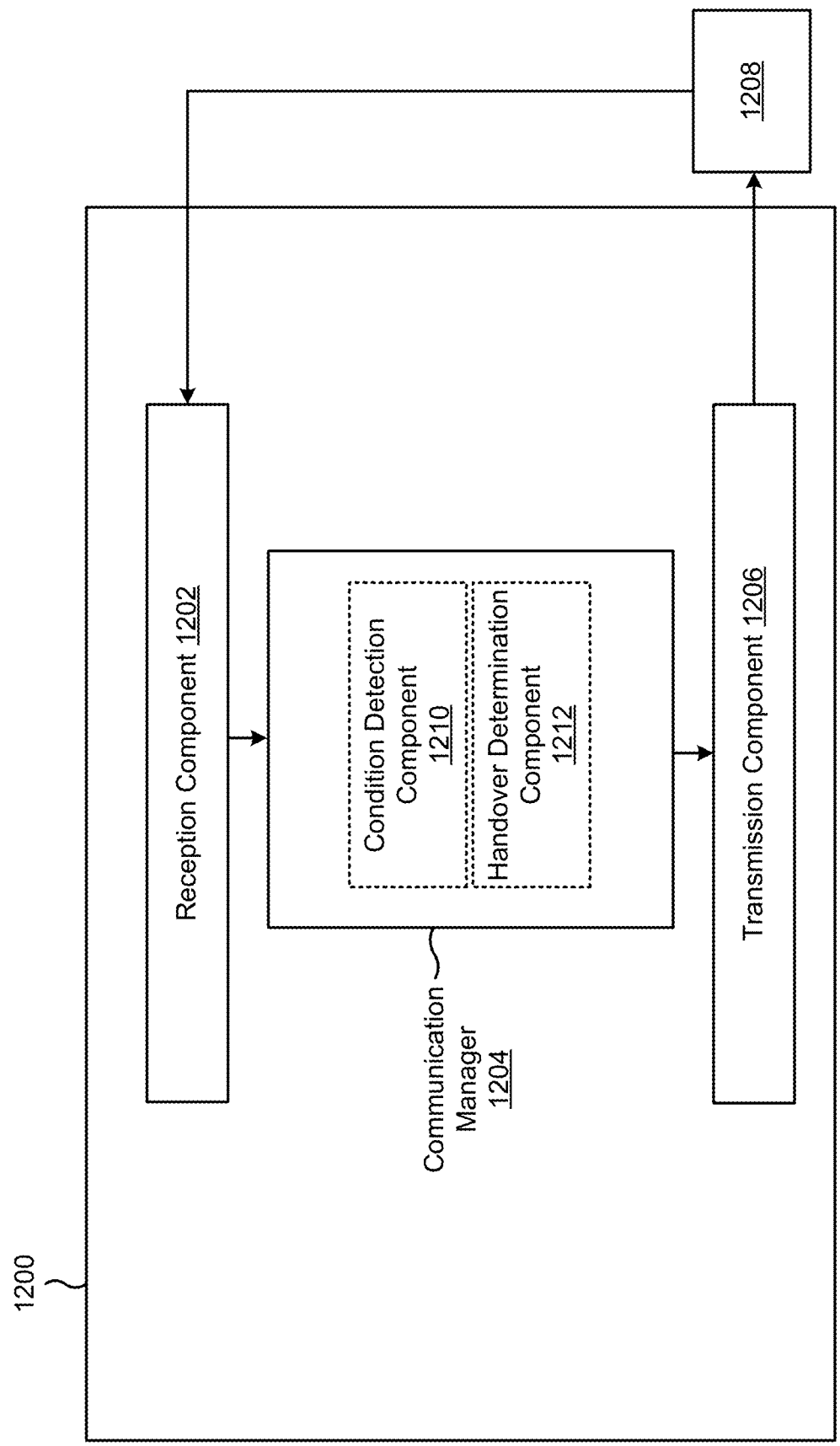
FIGS. 12 and 13 are block diagrams of example apparatuses for wireless communication in accordance with the present disclosure.

FIG. 12 is a block diagram of an example apparatus 1200 for wireless communication in accordance with the present disclosure. The apparatus 1200 may be a wireless node, or a wireless node may include the apparatus 1200. In some aspects, the apparatus 1200 includes a reception component 1202, a communication manager 1204, and a transmission component 1206, which may be in communication with one another (for example, via one or more buses). As shown, the apparatus 1200 may communicate with another apparatus 1208 (such as a UE, a base station, or another wireless communication device) using the reception component 1202 and the transmission component 1206.

In some aspects, the apparatus 1200 may be configured to perform one or more operations described herein in connection with FIG. 9. Additionally or alternatively, the apparatus 1200 may be configured to perform one or more processes described herein, such as process 1000 of FIG. 10, or a combination thereof. In some aspects, the apparatus 1200 may include one or more components of the UE described above in connection with FIG. 2.

The reception component 1202 may receive communications, such as reference signals, control information, data communications, or a combination thereof, from the apparatus 1208. The reception component 1202 may provide received communications to one or more other components of the apparatus 1200, such as the communication manager 1204. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1202 may include one or more antennas, a demodulator, a MIMO detector, a receive processor, a controller/processor, a memory, or a combination thereof, of the UE described above in connection with FIG. 2.

The transmission component 1206 may transmit communications, such as reference signals, control information, data communications, or a combination thereof, to the apparatus 1208. In some aspects, the communication manager 1204 may generate communications and may transmit the generated communications to the transmission component 1206 for transmission to the apparatus 1208. In some aspects, the transmission component 1206 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1206 may include one or more antennas, a modulator, a transmit MIMO processor, a transmit processor, a controller/processor, a memory, or a combination thereof, of the UE described above in connection with FIG. 2. In some aspects, the transmission component 1206 may be co-located with the reception component 1202 in a transceiver.

The communication manager 1204 may receive or may cause the reception component 1202 to receive, while the apparatus 1200 is connected to a first cell associated with a PCI and a first CGI, a message that includes an indication to connect to a second cell, associated with the PCI and a second CGI, responsive to detecting the second CGI in a system information message associated with the PCI. The communication manager 1204 may connect, or may cause the reception component 1202 and the transmission component 1206 to connect, to the second cell based at least in part on detecting the second CGI in the system information message associated with the PCI. In some aspects, the communication manager 1204 may include a controller/processor, a memory, or a combination thereof, of the UE described above in connection with FIG. 2.

In some aspects, the communication manager 1204 may receive or may cause the reception component 1202 to receive another message that indicates that the indication is not to be followed. In some aspects, the communication manager 1204 may receive or may cause the reception component 1202 to receive another message that indicates that one or more parameters of the indication are to be modified. In some aspects, the communication manager 1204 may receive or may cause the reception component 1202 to receive at least one of a page or a short message that indicates a change of system information.

In some aspects, the communication manager 1204 may include a set of components, such as a condition detection component 1210, a handover determination component 1212, or a combination thereof. Alternatively, the set of components may be separate and distinct from the communication manager 1204. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The condition detection component 1210 may monitor system information for the second CGI associated with the second cell. Moreover, the condition detection component 1210 may detect the second CGI in a system information message associated with the PCI. In addition, the condition detection component 1210 may determine that one or more triggering conditions for handover or PSCell change are satisfied. For example, the condition detection component 1210 may perform measurements of reference signals, and may determine that a channel quality metric associated with a reference signal satisfies a threshold value. The handover determination component 1212 may determine that the apparatus 1200 is to execute a handover or a PSCell change from the first cell to the second cell based at least in part on the condition detection component 1210 detecting the second CGI in the system information message. Additionally, the handover determination component 1212 may determine that the apparatus 1200 is to execute a handover or a PSCell change from the first cell to the second cell based at least in part on the condition detection component 1210 determining that the one or more triggering conditions for handover or PSCell change are satisfied. In other words, the handover determination component 1212 may determine that the apparatus 1200 is to connect to the second cell.

The quantity and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

Figure 13:
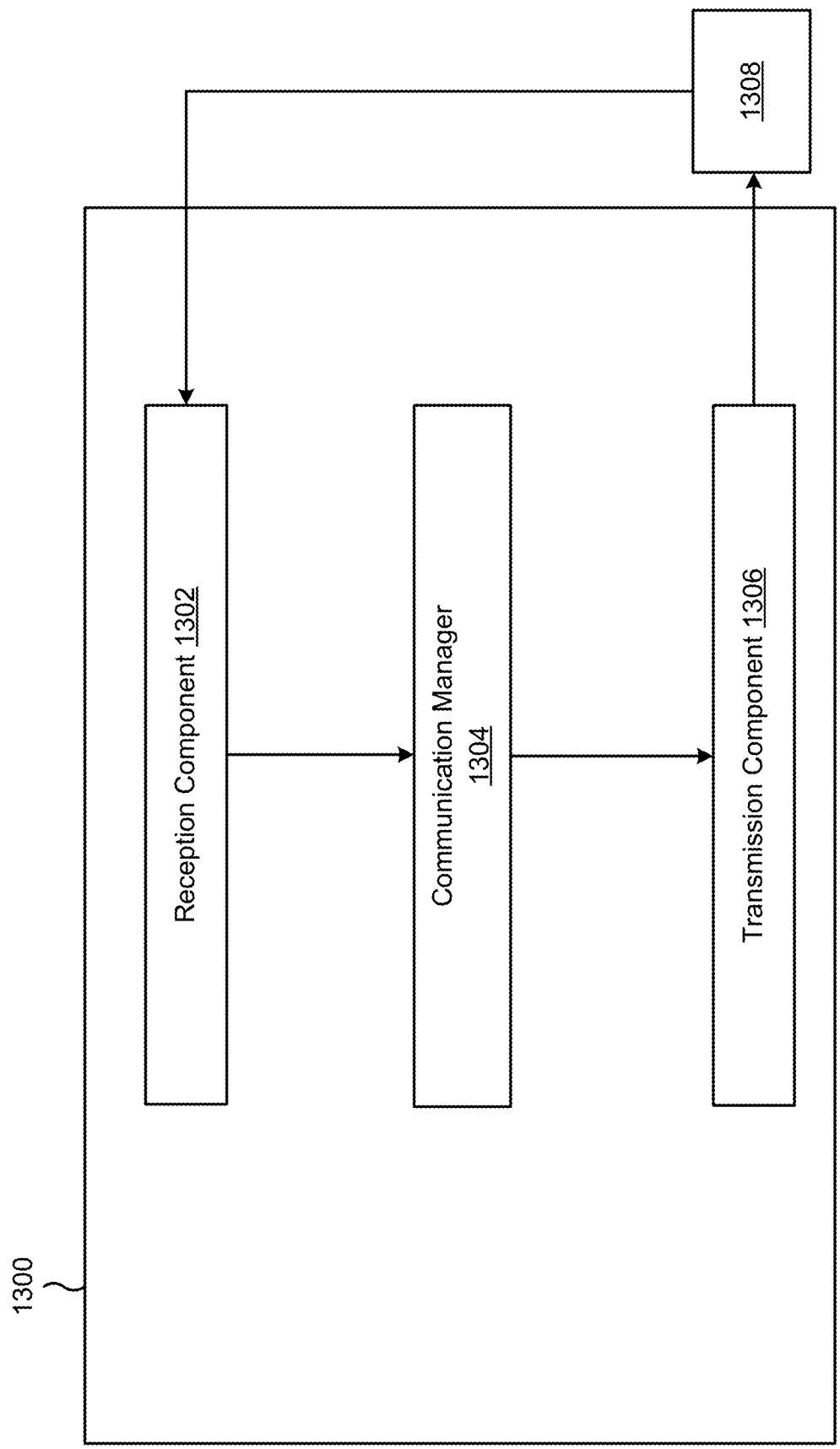

FIG. 13 is a block diagram of an example apparatus 1300 for wireless communication in accordance with the present disclosure. The apparatus 1300 may be a network node, or a network node may include the apparatus 1300. In some aspects, the apparatus 1300 includes a reception component 1302, a communication manager 1304, and a transmission component 1306, which may be in communication with one another (for example, via one or more buses). As shown, the apparatus 1300 may communicate with another apparatus 1308 (such as a UE, a base station, or another wireless communication device) using the reception component 1302 and the transmission component 1306.

In some aspects, the apparatus 1300 may be configured to perform one or more operations described herein in connection with FIG. 9. Additionally or alternatively, the apparatus 1300 may be configured to perform one or more processes described herein, such as process 1100 of FIG. 11, or a combination thereof. In some aspects, the apparatus 1300 may include one or more components of the base station described above in connection with FIG. 2.

The reception component 1302 may receive communications, such as reference signals, control information, data communications, or a combination thereof, from the apparatus 1308. The reception component 1302 may provide received communications to one or more other components of the apparatus 1300, such as the communication manager 1304. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1302 may include one or more antennas, a demodulator, a MIMO detector, a receive processor, a controller/processor, a memory, or a combination thereof, of the base station described above in connection with FIG. 2.

The transmission component 1306 may transmit communications, such as reference signals, control information, data communications, or a combination thereof, to the apparatus 1308. In some aspects, the communication manager 1304 may generate communications and may transmit the generated communications to the transmission component 1306 for transmission to the apparatus 1308. In some aspects, the transmission component 1306 may perform signal processing on the generated communications (such as filtering, amplification, modulation, digital-to-analog conversion, multiplexing, interleaving, mapping, or encoding, among other examples), and may transmit the processed signals to the apparatus 1308. In some aspects, the transmission component 1306 may include one or more antennas, a modulator, a transmit MIMO processor, a transmit processor, a controller/processor, a memory, or a combination thereof, of the base station described above in connection with FIG. 2. In some aspects, the transmission component 1306 may be co-located with the reception component 1302 in a transceiver.

The communication manager 1304 may determine that a wireless node, connected to a first cell associated with a PCI and a first CGI, is to connect to a second cell, associated with the PCI and a second CGI, responsive to detecting the second CGI in a system information message associated with the PCI. The communication manager 1304 may transmit or may cause the transmission component 1306 to transmit a message that includes an indication that the wireless node is to connect to the second cell responsive to detecting the second CGI in the system information message associated with the PCI. The communication manager 1304 may receive or may cause the reception component 1302 to receive another message indicating that the wireless node has applied the indication to connect to the second cell. In some aspects, the communication manager 1304 may include a controller/processor, a memory, a scheduler, a communication unit, or a combination thereof, of the base station described above in connection with FIG. 2.

In some aspects, the communication manager 1304 may transmit or may cause the transmission component 1306 to transmit another message that indicates that the indication is not to be followed. In some aspects, the communication manager 1304 may transmit or may cause the transmission component 1306 to transmit another message that indicates that one or more parameters of the indication are to be modified. In some aspects, the communication manager 1304 may transmit or may cause the transmission component 1306 to transmit at least one of a page or a short message that indicates a change of system information.

In some aspects, the communication manager 1304 may include a set of components. Alternatively, the set of components may be separate and distinct from the communication manager 1304. In some aspects, one or more components of the set of components may include or may be implemented within a controller/processor, a memory, a scheduler, a communication unit, or a combination thereof, of the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The quantity and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a wireless node, comprising: receiving, while connected to a first cell associated with a physical cell identifier (PCI) and a first cell global identifier (CGI), a message that includes an indication to connect to a second cell, associated with the PCI and a second CGI, responsive to detecting the second CGI in a system information message associated with the PCI; and connecting to the second cell based at least in part on detecting the second CGI in the system information message associated with the PCI.

Aspect 2: The method of Aspect 1, wherein the first cell or the second cell is served by a gNodeB, a gNodeB distributed unit, an eNodeB, an integrated access and backhaul (IAB) node, or an IAB donor.

Aspect 3: The method of any of Aspects 1-2, wherein the first cell and the second cell are served by a same network node.

Aspect 4: The method of any of Aspects 1-2, wherein the first cell and the second cell are served by different network nodes.

Aspect 5: The method of any of Aspects 1-4, wherein the wireless node is a user equipment.

Aspect 6: The method of any of Aspects 1-4, wherein the wireless node is a mobile termination component of an integrated access and backhaul (IAB) node.

Aspect 7: The method of any of Aspects 1-6, wherein the first CGI and the second CGI include at least one of different public land mobile network identifiers, different cell identifiers, different base station identifiers, or different local cell identifiers.

Aspect 8: The method of any of Aspects 1-7, wherein the message is a radio resource control (RRC) reconfiguration message that indicates RRC reconfiguration with synchronization or without synchronization.

Aspect 9: The method of any of Aspects 1-8, wherein the message further includes a security key update for the wireless node.

Aspect 10: The method of any of Aspects 1-9, wherein the indication is a command for a conditional handover from the first cell to the second cell.

Aspect 11: The method of any of Aspects 1-9, wherein the indication is a command for a conditional primary secondary cell change from the first cell to the second cell.

Aspect 12: The method of any of Aspects 1-11, wherein the indication further indicates that the wireless node is to connect to the second cell based at least in part on satisfaction of one or more criteria.

Aspect 13: The method of any of Aspects 1-12, wherein the indication further indicates that the wireless node is to connect to a third cell, associated with a third CGI and the PCI or another PCI, responsive to detecting the third CGI in the system information message associated with the PCI or responsive to detecting a system information message associated with the other PCI.

Aspect 14: The method of any of Aspects 1-13, wherein the second cell is one of a plurality of candidate cells indicated by the indication, and wherein the plurality of candidate cells are associated with respective measurement configurations.

Aspect 15: The method of any of Aspects 1-14, wherein the second cell is one of a plurality of candidate cells indicated by the indication, and wherein the plurality of candidate cells are associated with respective criteria for conditional handover or conditional primary secondary cell change.

Aspect 16: The method of any of Aspects 1-15, wherein the indication further indicates that the wireless node is to begin monitoring for the second CGI in the system information message associated with the PCI after a time duration.

Aspect 17: The method of any of Aspects 1-16, further comprising receiving another message that indicates that the wireless node is not to follow the indication.

Aspect 18: The method of any of Aspects 1-16, further comprising receiving another message that indicates that the wireless node is to modify one or more parameters of the indication.

Aspect 19: The method of any of Aspects 1-18, where the system information message is a broadcast message.

Aspect 20: The method of any of Aspects 1-18, where the system information message is a dedicated message for the wireless node.

Aspect 21: The method of any of Aspects 1-20, further comprising: receiving at least one of a page or a short message that indicates a change of system information; and receiving the system information message based at least in part on the receiving the at least one of the page or the short message.

Aspect 22: A method of wireless communication performed by a network node, comprising: transmitting, to a wireless node connected to a first cell associated with a physical cell identifier (PCI) and a first cell global identifier (CGI), a message that includes an indication that the wireless node is to connect to a second cell, associated with the PCI and a second CGI, responsive to detecting the second CGI in a system information message associated with the PCI; and receiving, from the wireless node, another message indicating that the wireless node has applied the indication to connect to the second cell.

Aspect 23: The method of Aspect 22, wherein the first cell or the second cell is served by a gNodeB, a gNodeB distributed unit, an eNodeB, an integrated access and backhaul (IAB) node, or an IAB donor.

Aspect 24: The method of any of Aspects 22-23, wherein the first cell and the second cell are served by a same network node.

Aspect 25: The method of any of Aspects 22-23, wherein the first cell and the second cell are served by different network nodes.

Aspect 26: The method of any of Aspects 22-25, wherein the wireless node is a user equipment.

Aspect 27: The method of any of Aspects 22-25, wherein the wireless node is a mobile termination component of an integrated access and backhaul (IAB) node.

Aspect 28: The method of any of Aspects 22-27, wherein the first CGI and the second CGI include at least one of different public land mobile network identifiers, different cell identifiers, different base station identifiers, or different local cell identifiers.

Aspect 29: The method of any of Aspects 22-28, wherein the message is a radio resource control (RRC) reconfiguration message that indicates RRC reconfiguration with synchronization or without synchronization.

Aspect 30: The method of any of Aspects 22-29, wherein the message further includes a security key update for the wireless node.

Aspect 31: The method of any of Aspects 22-30, wherein the indication is a command for a conditional handover from the first cell to the second cell.

Aspect 32: The method of any of Aspects 22-30, wherein the indication is a command for a conditional primary secondary cell change from the first cell to the second cell.

Aspect 33: The method of any of Aspects 22-32, wherein the indication further indicates that the wireless node is to connect to the second cell based at least in part on satisfaction of one or more criteria.

Aspect 34: The method of any of Aspects 22-33, wherein the indication further indicates that the wireless node is to connect to a third cell, associated with a third CGI and the PCI or another PCI, responsive to detecting the third CGI in the system information message associated with the PCI or responsive to detecting a system information message associated with the other PCI.

Aspect 35: The method of any of Aspects 22-34, wherein the second cell is one of a plurality of candidate cells indicated by the indication, and wherein the plurality of candidate cells are associated with respective measurement configurations.

Aspect 36: The method of any of Aspects 22-35, wherein the second cell is one of a plurality of candidate cells indicated by the indication, and wherein the plurality of candidate cells are associated with respective criteria for conditional handover or conditional primary secondary cell change.

Aspect 37: The method of any of Aspects 22-36, wherein the indication indicates that the wireless node is to begin monitoring for the second CGI in the system information message associated with the PCI after a time duration.

Aspect 38: The method of any of Aspects 22-37, further comprising transmitting another message that indicates that the wireless node is not to follow the indication.

Aspect 39: The method of any of Aspects 22-37, further comprising transmitting another message that indicates that the wireless node is to modify one or more parameters of the indication.

Aspect 40: The method of any of Aspects 22-39, where the system information message is a broadcast message.

Aspect 41: The method of any of Aspects 22-39, where the system information message is a dedicated message for the wireless node.

Aspect 42: The method of any of Aspects 22-41, further comprising transmitting at least one of a page or a short message that indicates a change of system information.

Aspect 43: An apparatus for wireless communication at a device, comprising a processor; memory coupled with the processor; and instructions stored in the memory and executable by the processor to cause the apparatus to perform the method of one or more of Aspects 1-21.

Aspect 44: A device for wireless communication, comprising a memory and one or more processors coupled to the memory, the one or more processors configured to perform the method of one or more of Aspects 1-21.

Aspect 45: An apparatus for wireless communication, comprising at least one means for performing the method of one or more of Aspects 1-21.

Aspect 46: A non-transitory computer-readable medium storing code for wireless communication, the code comprising instructions executable by a processor to perform the method of one or more of Aspects 1-21.

Aspect 47: A non-transitory computer-readable medium storing a set of instructions for wireless communication, the set of instructions comprising one or more instructions that, when executed by one or more processors of a device, cause the device to perform the method of one or more of Aspects 1-21.

Aspect 48: An apparatus for wireless communication at a device, comprising a processor; memory coupled with the processor; and instructions stored in the memory and executable by the processor to cause the apparatus to perform the method of one or more of Aspects 22-42.

Aspect 49: A device for wireless communication, comprising a memory and one or more processors coupled to the memory, the one or more processors configured to perform the method of one or more of Aspects 22-42.

Aspect 50: An apparatus for wireless communication, comprising at least one means for performing the method of one or more of Aspects 22-42.

Aspect 51: A non-transitory computer-readable medium storing code for wireless communication, the code comprising instructions executable by a processor to perform the method of one or more of Aspects 22-42.

Aspect 52: A non-transitory computer-readable medium storing a set of instructions for wireless communication, the set of instructions comprising one or more instructions that, when executed by one or more processors of a device, cause the device to perform the method of one or more of Aspects 22-42.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, since those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A wireless node for wireless communication, comprising:
   at least one processor; and
   at least one memory communicatively coupled with the at least one processor and storing processor-readable code that, when executed by the at least one processor, is configured to cause the wireless node to:
   receive, while connected to a first cell associated with a physical cell identifier (PCI) and a first cell global identifier (CGI), a message that includes an indication to connect to a second cell, associated with the PCI that is associated with the first cell and a second CGI, responsive to detecting the second CGI in a system information message associated with the PCI, wherein the first cell and the second cell are associated with a PCI collision; and
   connect to the second cell based at least in part on detecting the second CGI in the system information message associated with the PCI.

2. The wireless node of claim 1, wherein the wireless node is a user equipment or a mobile termination component of an integrated access and backhaul (IAB) node.

3. The wireless node of claim 1, wherein the message is a radio resource control (RRC) reconfiguration message that indicates RRC reconfiguration with synchronization or without synchronization.

4. The wireless node of claim 1, wherein the indication is a command for a conditional handover from the first cell to the second cell or a command for a conditional primary secondary cell change from the first cell to the second cell.

5. The wireless node of claim 1, wherein the indication further indicates that the wireless node is to connect to the second cell based at least in part on satisfaction of one or more criteria.

6. The wireless node of claim 1, wherein the second cell is one of a plurality of candidate cells indicated by the indication, and wherein the plurality of candidate cells are associated with at least one of respective measurement configurations or respective criteria for conditional handover or conditional primary secondary cell change.

7. The wireless node of claim 1, wherein the indication further indicates that the wireless node is to begin monitoring for the second CGI in the system information message associated with the PCI after a time duration.

8. The wireless node of claim 1, where the system information message is a broadcast message.

9. The wireless node of claim 1, where the system information message is a dedicated message for the wireless node.

10. The wireless node of claim 1, wherein the at least one memory further stores processor-readable code configured to cause the wireless node to:
    receive at least one of a page or a short message that indicates a change of system information; and
    receive the system information message based at least in part on the receiving the at least one of the page or the short message.

11. A network node for wireless communication, comprising:
    at least one processor; and
    at least one memory communicatively coupled with the at least one processor and storing processor-readable code that, when executed by the at least one processor, is configured to cause the network node to:
    transmit, to a wireless node connected to a first cell associated with a physical cell identifier (PCI) and a first cell global identifier (CGI), a message that includes an indication that the wireless node is to connect to a second cell, associated with the PCI that is associated with the first cell and a second CGI, responsive to detecting the second CGI in a system information message associated with the PCI, wherein the first cell and the second cell are associated with a PCI collision; and
    receive, from the wireless node, another message indicating that the wireless node has applied the indication to connect to the second cell.

12. The network node of claim 11, wherein the wireless node is a user equipment or a mobile termination component of an integrated access and backhaul (IAB) node.

13. The network node of claim 11, wherein the message is a radio resource control (RRC) reconfiguration message that indicates RRC reconfiguration with synchronization or without synchronization.

14. The network node of claim 11, wherein the indication is a command for a conditional handover from the first cell to the second cell or a command for a conditional primary secondary cell change from the first cell to the second cell.

15. The network node of claim 11, wherein the indication further indicates that the wireless node is to connect to the second cell based at least in part on satisfaction of one or more criteria.

16. The network node of claim 11, wherein the second cell is one of a plurality of candidate cells indicated by the indication, and wherein the plurality of candidate cells are associated with at least one of respective measurement configurations or respective criteria for conditional handover or conditional primary secondary cell change.

17. The network node of claim 11, wherein the indication indicates that the wireless node is to begin monitoring for the second CGI in the system information message associated with the PCI after a time duration.

18. The network node of claim 11, where the system information message is a broadcast message.

19. The network node of claim 11, where the system information message is a dedicated message for the wireless node.

20. The network node of claim 11, wherein the at least one memory further stores processor-readable code configured to cause the network node to transmit at least one of a page or a short message that indicates a change of system information.

21. A method of wireless communication performed by a wireless node, comprising:
    receiving, while connected to a first cell associated with a physical cell identifier (PCI) and a first cell global identifier (CGI), a message that includes an indication to connect to a second cell, associated with the PCI that is associated with the first cell and a second CGI, responsive to detecting the second CGI in a system information message associated with the PCI,
        wherein the first cell and the second cell are associated with a PCI collision; and
    connecting to the second cell based at least in part on detecting the second CGI in the system information message associated with the PCI.

22. The method of claim 21, wherein the indication is a command for a conditional handover from the first cell to the second cell.

23. The method of claim 21, wherein the indication is a command for a conditional primary secondary cell change from the first cell to the second cell.

24. The method of claim 21, wherein the indication further indicates that the wireless node is to connect to the second cell based at least in part on satisfaction of one or more criteria.

25. The method of claim 21, wherein the indication further indicates that the wireless node is to begin monitoring for the second CGI in the system information message associated with the PCI after a time duration.

26. A method of wireless communication performed by a network node, comprising:
    transmitting, to a wireless node connected to a first cell associated with a physical cell identifier (PCI) and a first cell global identifier (CGI), a message that includes an indication that the wireless node is to connect to a second cell, associated with the PCI that is associated with the first cell and a second CGI, responsive to detecting the second CGI in a system information message associated with the PCI,
        wherein the first cell and the second cell are associated with a PCI collision; and
    receiving, from the wireless node, another message indicating that the wireless node has applied the indication to connect to the second cell.

27. The method of claim 26, wherein the indication is a command for a conditional handover from the first cell to the second cell.

28. The method of claim 26, wherein the indication is a command for a conditional primary secondary cell change from the first cell to the second cell.

29. The method of claim 26, wherein the indication further indicates that the wireless node is to connect to the second cell based at least in part on satisfaction of one or more criteria.

30. The method of claim 26, wherein the indication indicates that the wireless node is to begin monitoring for the second CGI in the system information message associated with the PCI after a time duration.

* * * * *